(12) United States Patent
White et al.

(10) Patent No.: US 8,844,949 B2
(45) Date of Patent: Sep. 30, 2014

(54) COLLAPSIBLE SHOPPING CART

(71) Applicant: Cargo Cart Co., Severna Park, MD (US)

(72) Inventors: Allison White, Severna Park, MD (US); David White, Severna Park, MD (US); Matthew A. Sommerfield, Allentown, PA (US)

(73) Assignee: Cargo Cart Co., Severna Park, MD (US)

( * ) Notice: Subject to any disclaimer, the term of this patent is extended or adjusted under 35 U.S.C. 154(b) by 0 days.

(21) Appl. No.: 14/039,121

(22) Filed: Sep. 27, 2013

(65) Prior Publication Data

US 2014/0035262 A1    Feb. 6, 2014

Related U.S. Application Data

(63) Continuation-in-part of application No. 13/446,482, filed on Apr. 13, 2012, now Pat. No. 8,567,809.

(60) Provisional application No. 61/517,007, filed on Apr. 13, 2011.

(51) Int. Cl.
*B62B 3/02* (2006.01)
*B62B 5/06* (2006.01)
*B62B 3/14* (2006.01)

(52) U.S. Cl.
CPC .............. *B62B 3/027* (2013.01); *B62B 2205/02* (2013.01); *B62B 5/067* (2013.01); *B62B 3/1496* (2013.01)
USPC .......... 280/38; 280/47.36; 280/639; 280/646; 280/655

(58) Field of Classification Search
USPC ......... 280/638, 35, 639, 38, 39, 641, 646, 42, 280/651, 655, 47.35
See application file for complete search history.

(56) References Cited

U.S. PATENT DOCUMENTS

| | | | |
|---|---|---|---|
| 2,133,834 | A | 10/1938 | Sheldon |
| 2,141,881 | A | 12/1938 | Schray |
| 2,212,053 | A | 8/1940 | Smith |
| 3,326,571 | A | 6/1967 | Levine |
| 4,047,724 | A | 9/1977 | Shaffer |
| 5,507,507 | A | 4/1996 | Davidson |
| 5,660,476 | A | 8/1997 | DeCoster |
| 5,694,663 | A | 12/1997 | Tserng |
| 6,394,471 | B1 | 5/2002 | Watson |
| 6,619,546 | B1 | 9/2003 | Nguyen et al. |
| 6,695,324 | B1 | 2/2004 | Wu |
| 6,766,931 | B2 | 7/2004 | Wolf |
| 7,168,715 | B1 | 1/2007 | Friedman |
| 7,188,847 | B1 | 3/2007 | Friedman |
| 7,392,992 | B2 | 7/2008 | Stone et al. |

(Continued)

*Primary Examiner* — Hau Phan
*Assistant Examiner* — Bryan Evans
(74) *Attorney, Agent, or Firm* — Welsh Flaxman & Gitler LLC

(57) ABSTRACT

A collapsible shopping cart includes a collapsible support assembly having a support frame with a vertical frame member and a horizontal frame member. The vertical support member is pivotally secured to the horizontal support member allowing the support frame to be selectively folded. A plurality of wheels are coupled to the horizontal support member. The plurality of wheels are coupled to the horizontal support member for movement between a use orientation and a storage orientation, wherein when the plurality of wheels are in the use orientation they extend from the horizontal support member in a manner permitting engagement with a horizontal support surface such that the support assembly may roll thereupon. First and second storage receptacles shaped and dimensioned for selective attachment to the support assembly are provided.

7 Claims, 29 Drawing Sheets

(56) References Cited

U.S. PATENT DOCUMENTS

| | | |
|---|---|---|
| 7,566,069 B1 | 7/2009 | Ortega et al. |
| 7,703,776 B1 | 4/2010 | Nugent |
| D634,913 S | 3/2011 | Xie |
| 2002/0149176 A1 | 10/2002 | Miller |
| 2007/0096437 A1 | 5/2007 | Watson |
| 2008/0191451 A1 | 8/2008 | Driessen |
| 2008/0303248 A1 | 12/2008 | Chaparro |
| 2010/0052275 A1 | 3/2010 | Reimers et al. |

COLLAPSIBLE SHOPPING CART

CROSS REFERENCE TO RELATED APPLICATION

This application is a continuation in part of U.S. patent application Ser. No. 13/446,482, entitled "COLLAPSIBLE SHOPPING CART", filed Apr. 13, 2012, which is currently pending, which claims the benefit of U.S. Patent Application Ser. No. 61/517,007, entitled "'Car-go green' the collapsible shopping cart for sustainable living", filed Apr. 13, 2011.

BACKGROUND OF THE INVENTION

1. Field of the Invention

The invention relates to a collapsible shopping cart.

2. Description of the Related Art

A trip to the grocery store can be quite eventful, involving may steps and potential pitfalls. One example of the current grocery shopping experience may look like this.

The shopper first retrieves a store-provided shopping cart from the parking lot and, if inclined, cleans handle of the store's shopping cart. Not knowing the cleaning routines used to sanitize the cart or the hand-washing habits of previous cart users can lead to a week long bout with the flu, cold or other infection.

Once inside the store, the shopper chooses item(s) and bags item(s) (if in produce or meat section), placing the various selected items in the store's shopping cart. The shopper then removes the item(s) from cart at checkout line and places item(s) on the conveyor belt to be scanned. The scanned item(s) are then bagged by a store employee or by the shopper. The bagged item(s) are then returned to store's cart and the shopper pays the cashier.

The shopper then wheels the cart out of the store and to his/her automobile, where he/she removes the bagged item(s) from the store's shopping cart and places them in the automobile. The shopper then drives home and removes the item(s) from automobile and carries them into the house, condo, office or apartment building (often requiring multiple trips). The shopper then un-bags item(s), places the item(s) in storage, places the plastic bag(s) in the recycle bin or trashcan, or returns plastic and/or paper bag(s) to store's used-bag collection site.

This is a complicated time consuming process require multiple unnecessary steps. The above description illustrates potential pitfalls commonly experienced when depending on a store provided cart. One can imagine other potential pitfalls that arise when shopping at open markets, farmer's markets etc. where no cart or basket is provided to the shopper.

For those living in urban environments similar elaborate processes are encountered during the shopping processing. Still further, those living in urban environments often walk to the store and require their own cart for carrying goods between the store and their home. They also often have limited space to store such carts when they are not in use. There are also environments where shopping carts are not readily available, for example, farmer markets, and an easily transported cart would be highly desirable.

SUMMARY OF THE INVENTION

It is, therefore, an object of the present invention to provide a collapsible cart. The cart includes a collapsible support assembly having a support frame with a vertical frame member and a horizontal frame member. The vertical support member is pivotally secured to the horizontal support member allowing the support frame to be selectively folded. The vertical frame member is an elongated member having a first end and a second end and the horizontal frame member is an elongated member having a first end and a second end. The horizontal frame member has an upper surface and a lower surface, the first end of the vertical frame member being pivotally connected to the first end of the horizontal frame member. A plurality of wheels are coupled to the horizontal support member. The plurality of wheels are coupled to the horizontal support member for movement between a use orientation and a storage orientation, wherein when the plurality of wheels are in the use orientation they extend from the horizontal support member in a manner permitting engagement with a horizontal support surface such that the support assembly may roll thereupon. The plurality of wheels includes first and second rear wheels controlled by a linkage assembly. The linkage assembly includes a slide plate which moves rearwardly from the second end of the horizontal frame to cause movement of the first and second rear wheels from the use orientation to the storage orientation. The cart also includes a first storage receptacle shaped and dimensioned for selective attachment to the support assembly and a second storage receptacle shaped and dimensioned for selective attachment to the support assembly.

It is also an object of the present invention to provide a cart wherein the linkage assembly includes a first linkage assembly controlling movement of the first rear wheel and a second linkage assembly controlling movement of the second rear wheel.

It is another object of the present invention to provide a cart wherein the first linkage assembly is composed of a first rear support arm and a first front parallelogram arm and the second linkage assembly is composed of a second rear support arm and a second front parallelogram arm.

It is a further object of the present invention to provide a cart wherein the slide plate includes a window which engages the first front parallelogram arm and the second front parallelogram arm to control movement.

It is another object of the present invention to provide a cart wherein the second ends of the respective first rear support arm and the first front parallelogram arm are pivotally connected to the first rear wheel.

It is also an object of the present invention to provide a cart wherein the first end of the first rear support arm is pivotally connected to the first end of the horizontal frame member and the first end of the first front parallelogram arm is pivotally coupled to the horizontal frame member at a pivot point.

It is a further object of the present invention to provide a cart wherein an elongated tip member of the first front parallelogram extends beyond the pivot point and through the window formed in the slide plate.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

Figure 1:
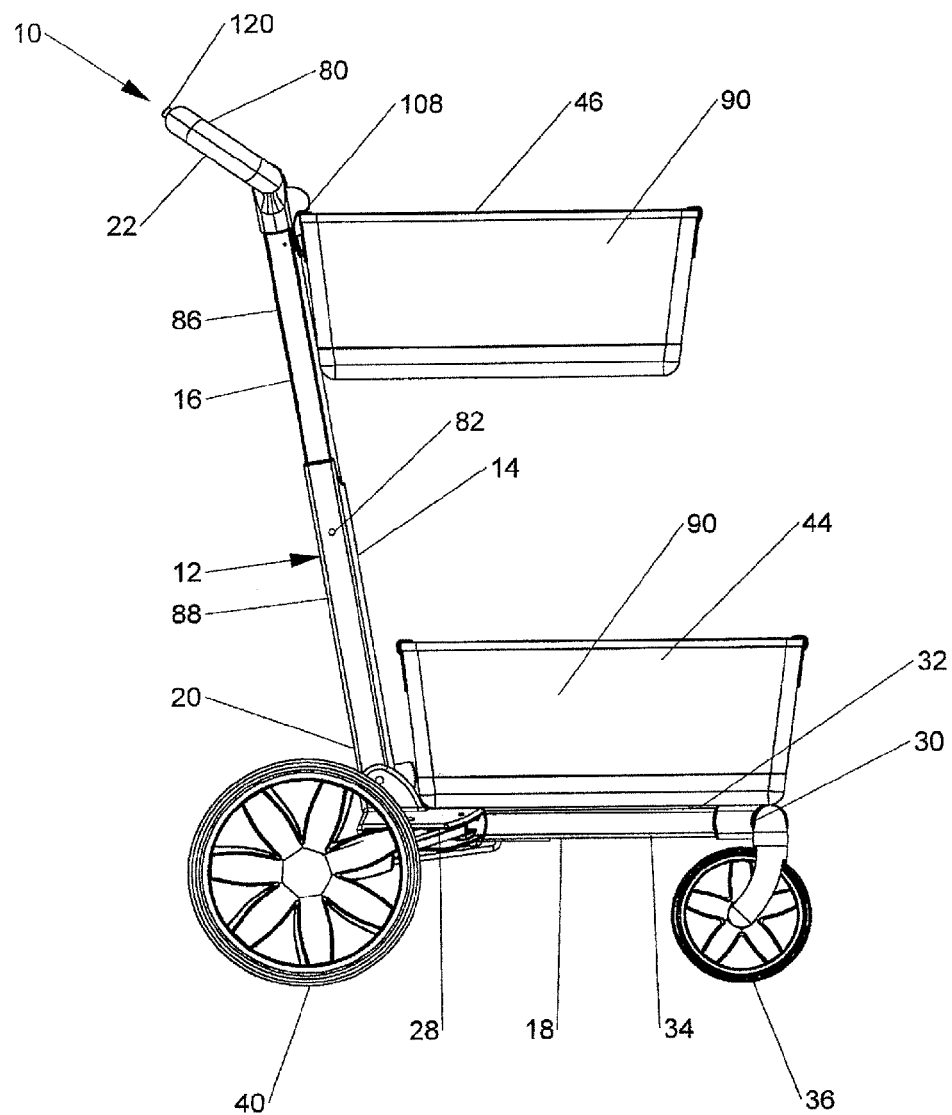
FIG. 1 is a side plan view of an embodiment of a collapsible shopping cart in accordance with the present invention.
Figure 2:
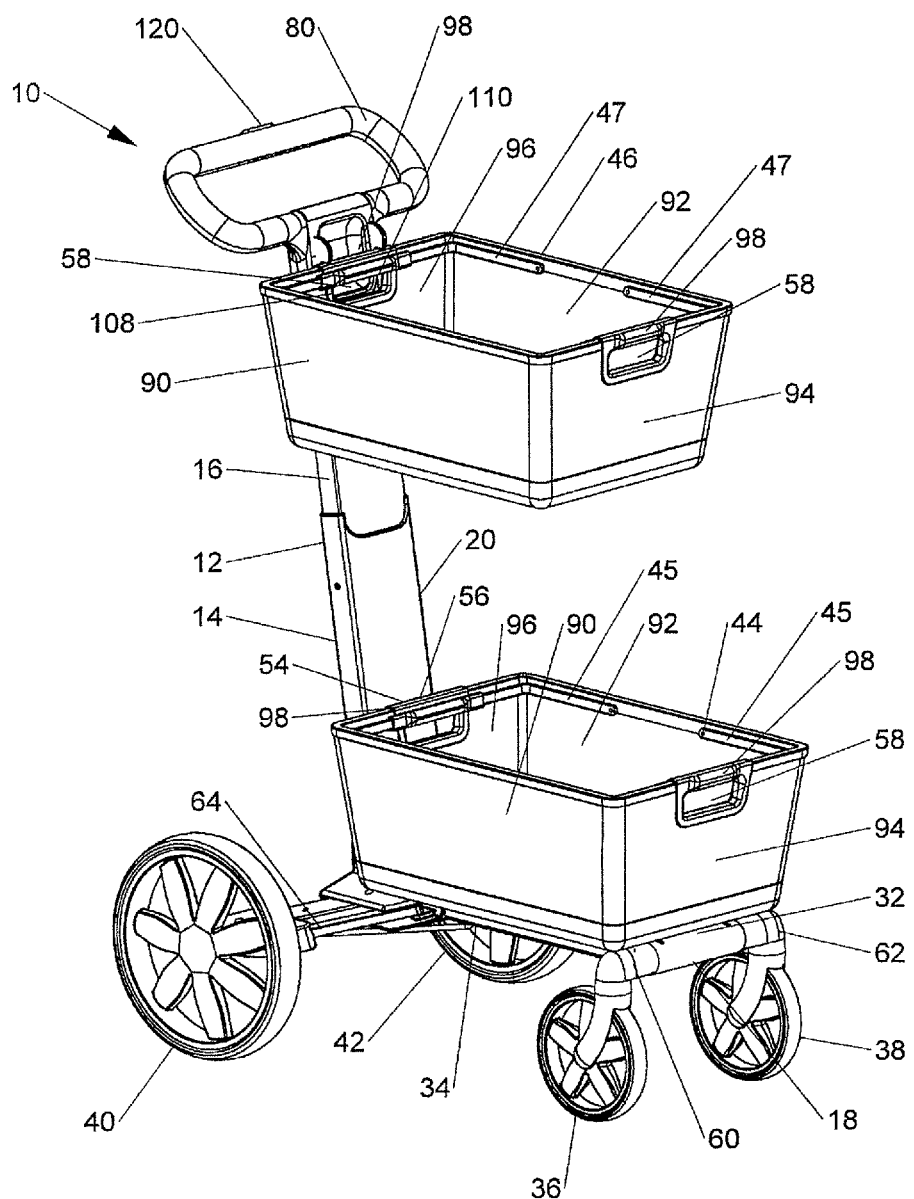
FIG. 2 is a perspective view of the collapsible shopping cart shown in FIG. 1.
Figure 3:
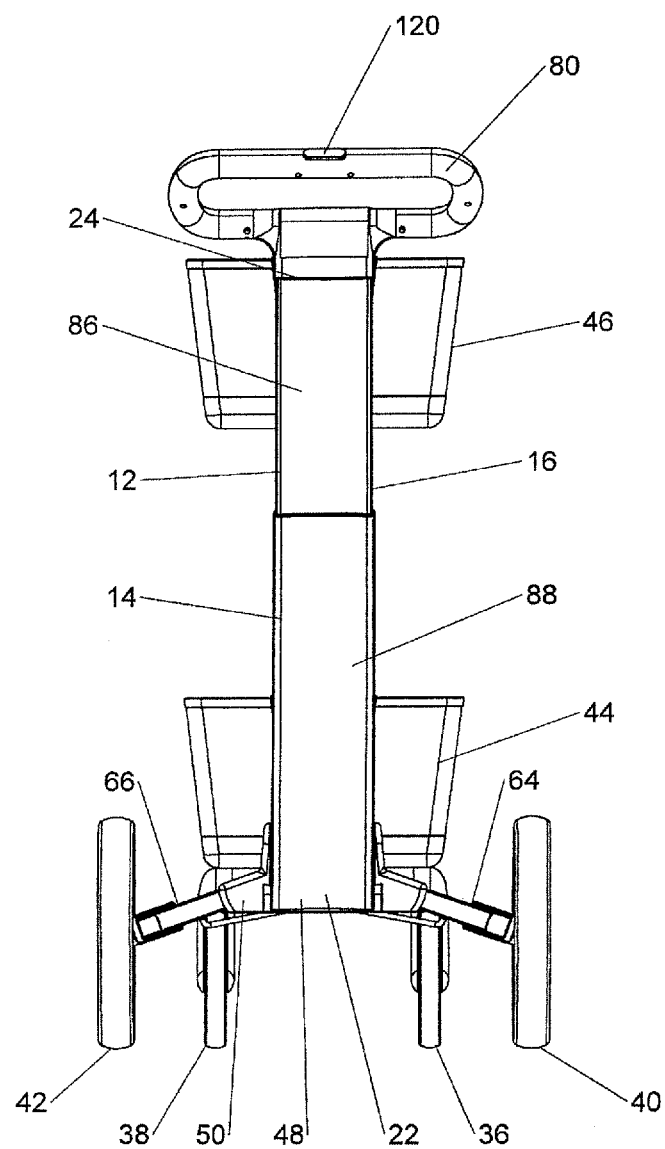
FIG. 3 is a rear plan view of the collapsible shopping cart shown in FIG. 1.
Figure 4:
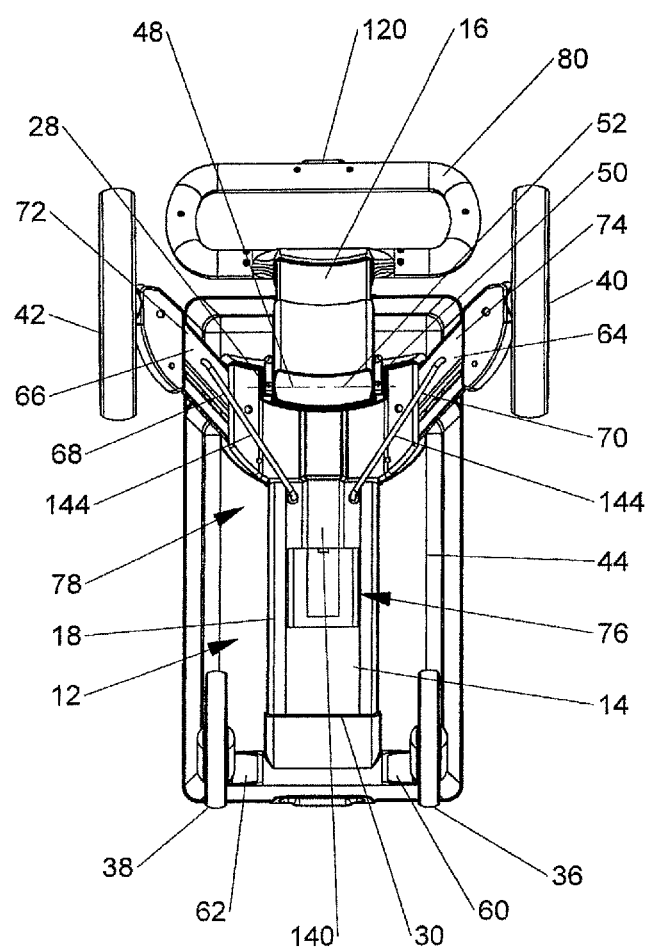
FIG. 4 is a bottom view of the collapsible shopping cart shown in FIG. 1.
Figure 5:
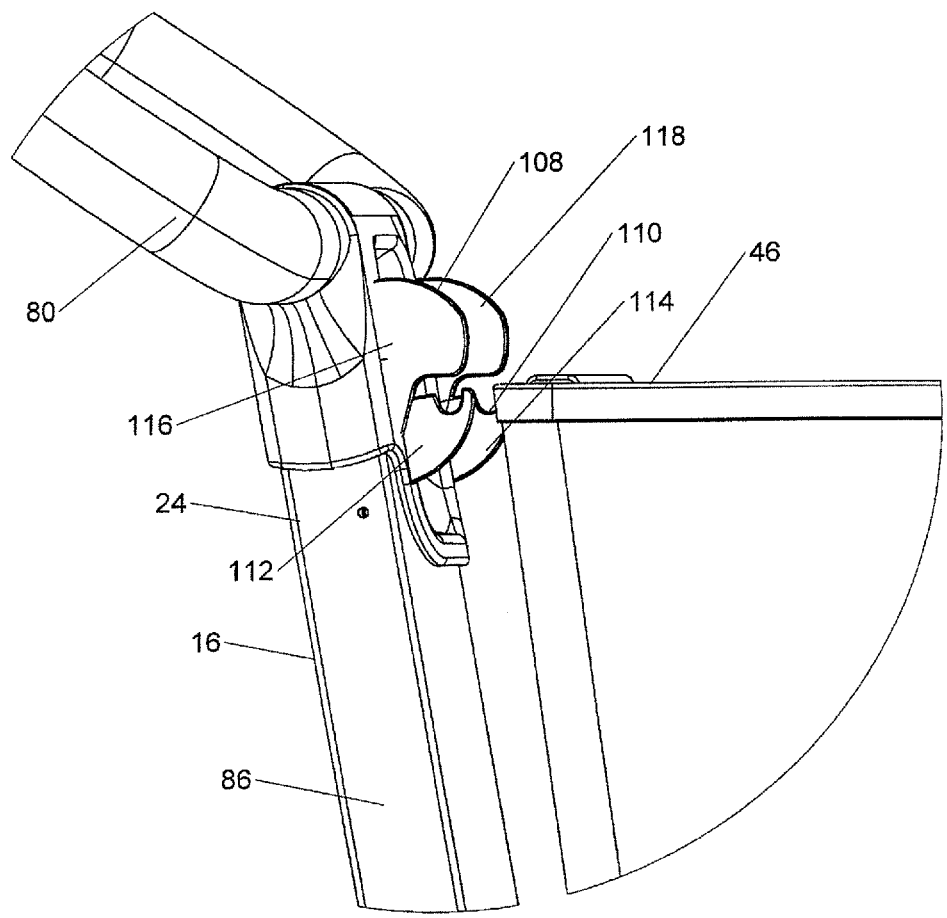
FIGS. 5 and 6 are detailed side views showing attachment of a storage receptacle to the support frame of the collapsible shopping cart of FIG. 1.
Figure 6:
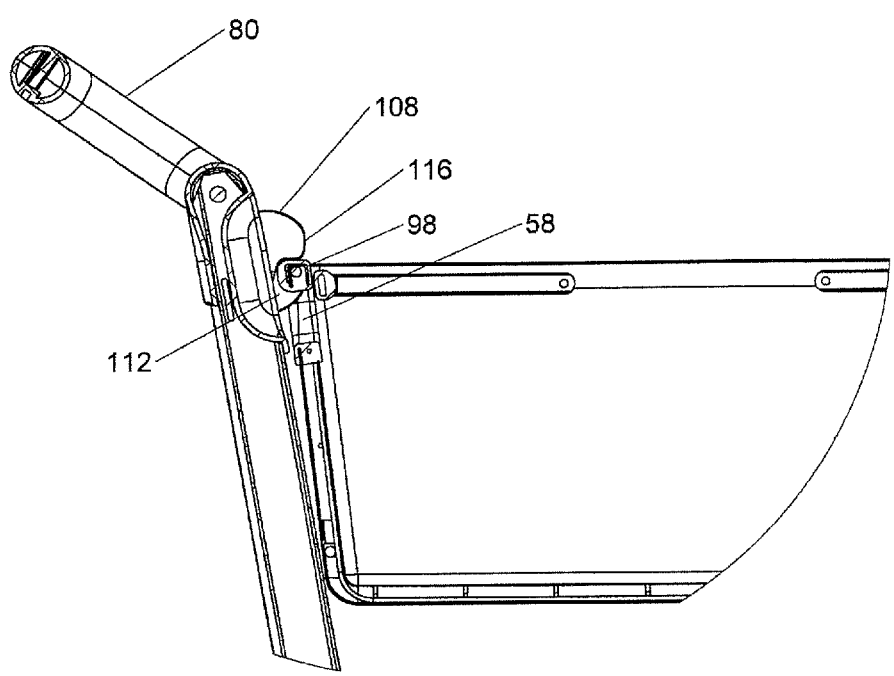
Figure 7:
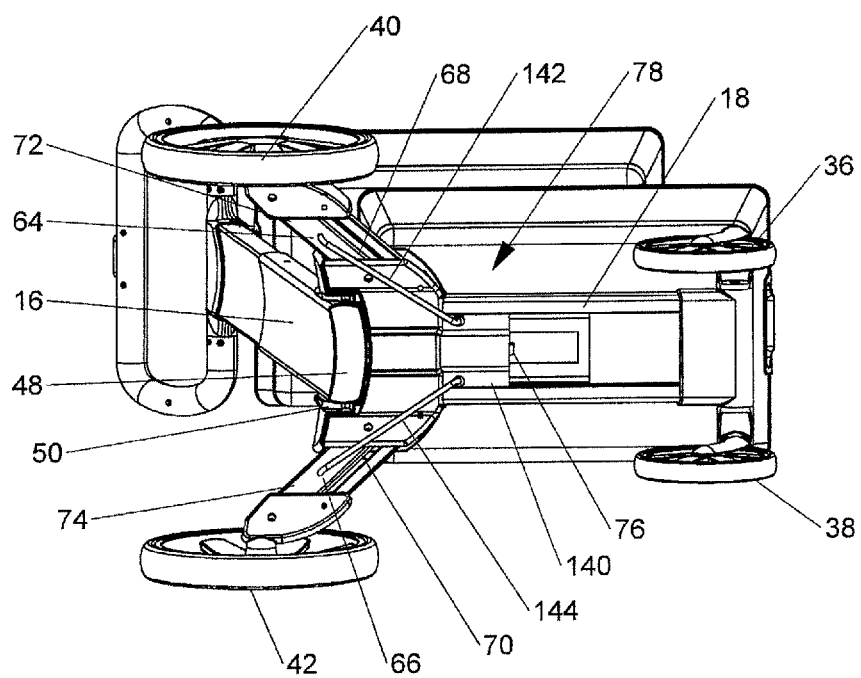
FIG. 7 is a detailed bottom view of the collapsible shopping cart shown in FIG. 1.
Figure 8A:
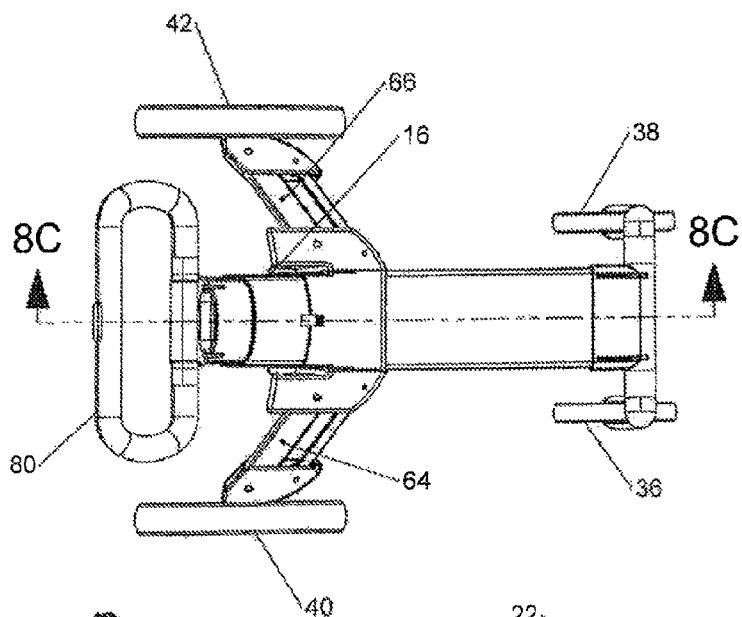
FIGS. 8A, 8B and 8C are respectively a top view, a cross sectional view and a detailed cross sectional view showing the linkage assembly employed in movement of the first and second rear wheels of the collapsible shopping cart of FIG. 1.
Figure 8B:
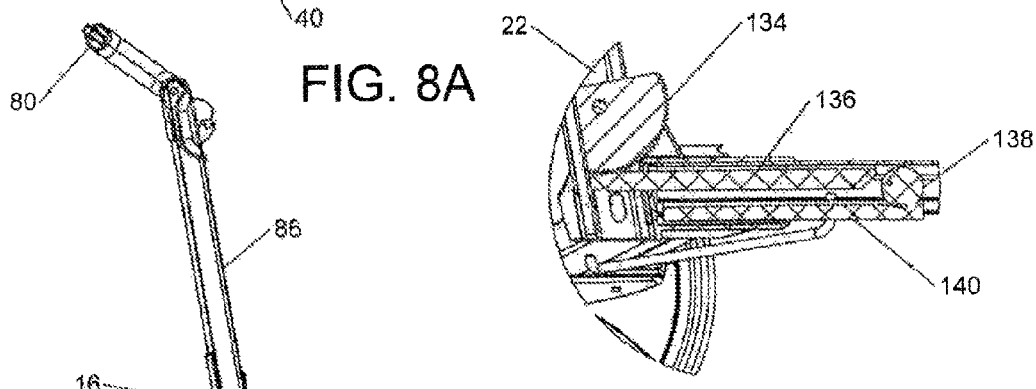
Figure 8C:
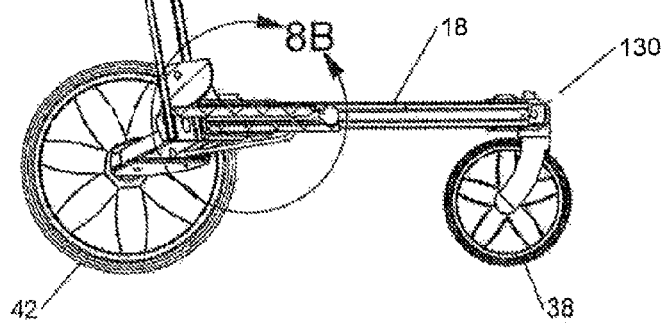
Figure 9:
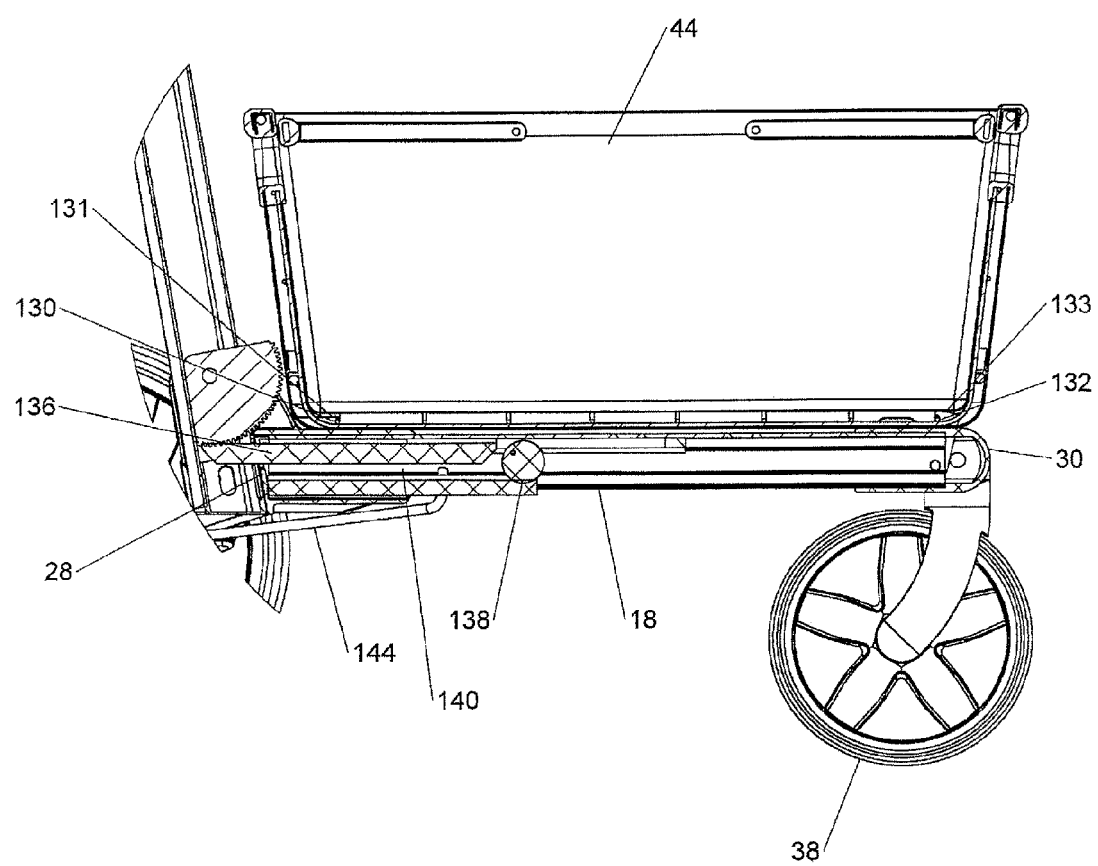
FIG. 9 is a detailed side cross sectional view showing the mechanism for attachment of the first storage receptacle to the horizontal frame member of the collapsible shopping cart of FIG. 1.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

In accordance with the present invention, and with reference to FIGS. 1 to 14, a collapsible shopping cart 10 is disclosed. It should be noted that although the term shopping cart is used in describing the present invention, the cart may be used in a variety of applications where a purchase of products is not involved, for example, it might be used in conjunction with picnics, amusement parks, etc. to move miscellaneous items in a convenient manner. Briefly, and as will be discussed below in greater detail, the collapsible shopping cart 10 includes a collapsible support assembly 12 having a support frame 14. The support frame 14 is composed of a vertical (or first) frame member 16 and a horizontal (or second) frame member 18, the vertical frame member 16 being pivotally secured to the horizontal frame member 18 allowing the support frame 14 to be selectively folded between a user orientation and a storage orientation. The vertical frame member 16 is an elongated member 20 having a first end 22 and a second end 24. The horizontal frame member 18 is an elongated member 26 having a first end 28 and a second end 30, as well as an upper surface 32 and a lower surface 34. The first end 22 of the vertical frame member 16 is pivotally connected to the first end 28 of the horizontal frame member 18.

A plurality of wheels 36, 38, 40, 42 are coupled to the horizontal frame member 18 for movement between a use orientation and a storage orientation, wherein when the plurality of wheels 36, 38, 40, 42 are in the use orientation they extend from the horizontal frame member 18 in a manner permitting engagement with a horizontal support surface such that the support assembly 12 may roll thereupon. It is appreciated brakes are planned as a feature of the shopping cart. The brakes will be conventional in nature and similar to those currently used with strollers, golf carts, etc. A preferred brake most likely would be a foot petal that is pushed to lock and pushed again to release. The shopping cart 10 also includes a first storage receptacle 44 shaped and dimensioned for selective attachment to the upper surface 32 of the horizontal frame member 18 and a second storage receptacle 46 shaped and dimensioned for selective attachment to the vertical frame member 16. In accordance with a preferred embodiment, the straight and telescoping sections, that is, the frame member of the shopping cart are intended to be extruded aluminum. The various connecting pieces, end fittings, wheels, etc. are preferably molded plastic, more preferably glass reinforced Nylon, and coupling members, for example, screws, etc., may be steel.

It will be appreciated terms such as "vertical" and "horizontal" are relative terms used to describe the present invention. These terms refer to the shopping cart when in a preferred use orientation as shown in the various drawings.

The present shopping cart 10 provides a sturdy and appealing collapsible shopping cart 10 for collecting, holding, and transporting items purchased at a retail outlet to an automobile and then into a house, apartment, condo/office, etc. The present shopping cart 10 also provides a mechanism to transport items via foot in walkable communities. The shopping cart 10 is preferably constructed of light-weight aluminum and/or other metals and plastics. It has four support arms, each with a 6½ inch (front wheels) to 11 inch wheel (rear wheels) that allows for use on rough/uneven surfaces and stairs.

The present shopping cart 10 offers various advantages. For example, it allows shoppers to use their own shopping cart 10 and cart containers (or storage receptacles as referred to herein) to hold groceries and other items. The present shopping cart 10 also allows shoppers to pack their own items as they shop thereby preventing/reducing grocery item bruising, breaking, smashing, squishing and cross-contamination. The present shopping cart 10 also reduces the use of plastic and paper bags. And using currently available technology, shoppers can scan their groceries as they shop and pack them directly into the storage receptacles thereby reducing or eliminating the use of paper and plastic in the produce section, meat section, and at the checkout line. The present shopping cart 10 also provides for increased sanitation by reducing handling by store employees and contact with store-owned carts and store checkout conveyor belts. The present shopping cart 10 also significantly reduces shopper fatigue by decreasing the number of times a shopper handles an item and/or a bag of items.

As discussed above, the support frame 14 is collapsible between a use orientation and storage orientation. Movement between these orientations is generally achieved by pivotally connecting the vertical frame member 16 to the horizontal frame member 18. The first end 22 of the vertical frame member 16 is provided with a projection 48 shaped and dimensioned to fit within a recess 50 formed in the first end 28 of the horizontal frame member 18. A pivot pin 52 couples the projection 48 within the recess 50 such that the vertical frame member 16 and the horizontal frame member 18 may pivot relative to each other.

The pivot pin 52 includes longitudinal axis that is oriented substantially perpendicular to the longitudinal axes of both the vertical frame member 16 and the horizontal frame member 18. In this way, the vertical frame member 16 is folded upon the horizontal frame member 18 when the support frame 14 is moved between its use orientation and its storage orientation. In particular, the vertical frame member 16 and the horizontal frame member 18 move between a relative position where the longitudinal axis of the vertical frame member 16 and the longitudinal axis of the horizontal frame member 18 are in a slightly obtuse angular orientation when the shopping cart 10 is in its use orientation and a relative position where the longitudinal axis of the vertical frame member 16 and the longitudinal axis of the horizontal frame member 18 are in a substantially parallel orientation when the shopping cart 10 is in its storage orientation. The support frame 14 is secured, but selectively, held in the respective use orientation and storage orientation by various latching structures, for example, the lock pin 82 of the vertical frame member 16 and the tilt lock pin 84 secured between the vertical frame member 16 and the horizontal frame member 18 discussed below in greater detail.

Extending from the horizontal frame member 18 are a plurality of wheels 36, 38, 40, 42. In accordance with a preferred embodiment, the horizontal frame member 18 is provided with first and second front wheels 36, 38 and first and second rear wheels 40, 42. The first and second front wheels 36, 38 are pivotally coupled to the second end 30 of the horizontal frame member 18 on opposite sides thereof. The first and second rear wheels 40, 42 are pivotally coupled to the first end 28 of the horizontal frame member 18 on opposite sides thereof.

The first and second front wheels 36, 38 are respectively supported by first and second front support arms 60, 62 which extend laterally from opposite sides of the horizontal frame member 18 at the second end 30 of the horizontal frame member 18. The first and second front wheels 36, 38 are pivotally secured to the first and second front support arms 60, 62 in a manner allowing the first and second front wheels 36, 38 to swivel relative thereto. More particularly, each of the first end second front support arms 60, 62 includes a longitudinal axis that extends perpendicular to the longitudinal axis of the horizontal frame member 18 and thereby supports the first and second front wheels 36, 38 positioned beyond the lateral extent of the horizontal frame member 18. This orientation adds to the stability of the overall shopping cart 10 when in its use orientation.

Similarly, the first and second rear wheels 40, 42 are respectively supported by first and second rear support arms 64, 66 which extend obliquely from opposite sides of the horizontal frame member 18 at the first end 28 of the horizontal frame member 18 such that the first and second rear wheels 40, 42 are supported in a position beyond both the lateral and longitudinal extent of the horizontal frame member 18. More particularly, each of the first end second rear support arms 64, 66 includes a first end 68, 70 pivotally secured to the horizontal frame member 18 and second end 72, 74 to which the respective first and second rear wheels 40, 42 are secured. The first ends 68, 70 of the respective first and second rear support arms 64, 66 are pivotally secured to the first end 28 of the horizontal frame member 18 so as to pivot about an axis that is substantially perpendicular to the longitudinal axis of the horizontal frame member 18 and substantially perpendicular to the axes of the first and second front support arms 64, 66.

Given the axis about which the first and second rear support arms 64, 66 rotate, the first and second rear support arms 64, 66, as well as the first and second rear wheels 40, 42, designed to rotate between a use orientation in which the first and second rear wheels 40, 42 are supported in a position beyond both the lateral and longitudinal extent of the horizontal frame member 18 and a storage position in which the first and second rear wheels 40, 42 are held adjacent to the horizontal frame member 18. Movement is achieved by the provision of a control lever 76 connected to both the first and second rear support arms 64, 66 by a linkage assembly 78.

Figure 11A:
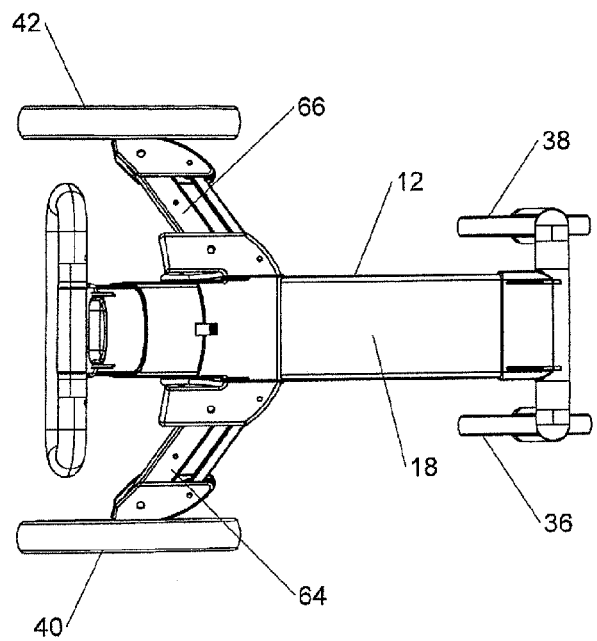
Figure 11B:
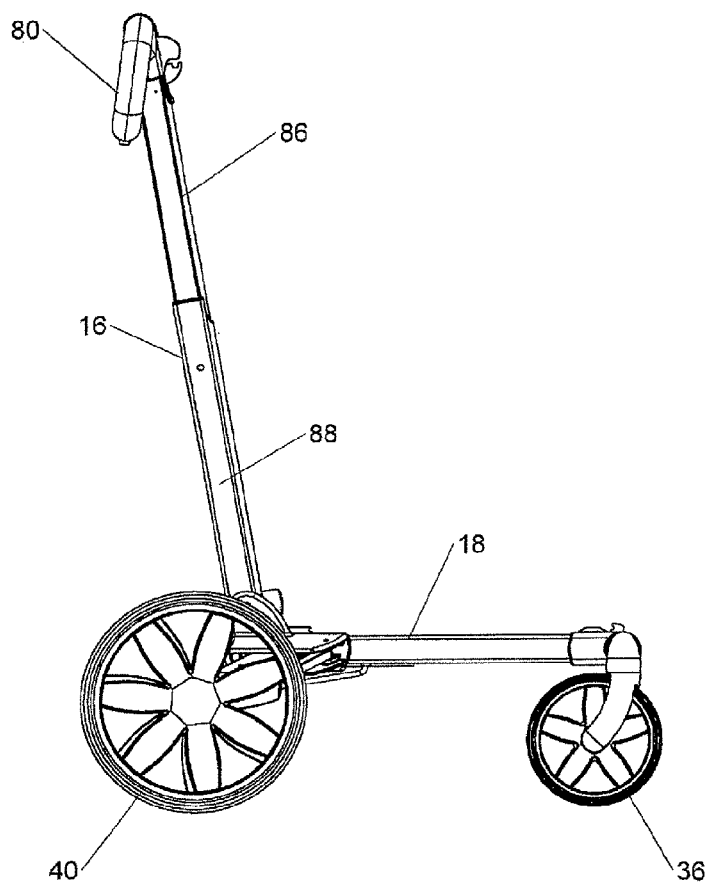
Figure 13A:
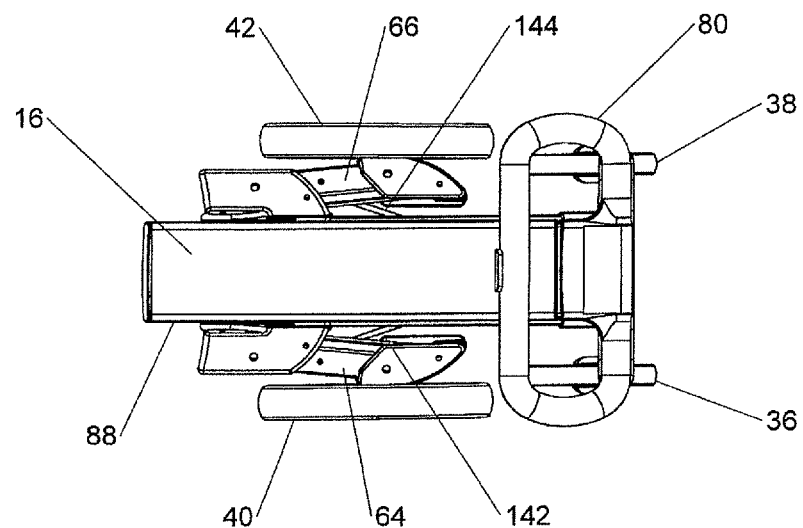
FIGS. 13A, 13B, 14A and 14B are top views and side views showing the support frame of the collapsible shopping cart shown in FIG. 1 in various stages of the collapse.

As such, and as will be discussed below in greater detail, upon movement of upper vertical frame component 86 to its storage position within the lower vertical frame component 88 the tilt lock pin 84 is moved to its release position permitting pivoting of the vertical frame member 16 relative to the horizontal frame member 18 as shown with reference to FIGS. 11A&B and 12A,B&C. During movement to the storage orientation, after the upper vertical frame component 86 is moved downward within the lower frame component 88 and the tilt lock pin 84 is moved to its release position, the vertical frame member 16 is rotated relative to the horizontal frame member 18, in particular, toward the horizontal frame member 18. As the vertical frame member 16 is rotated toward the horizontal frame member 18, a gear member 134 secured to the vertical frame member 16 adjacent the first end 22 thereof is rotated. It should first be appreciated that although teeth are not shown in the various gear parts discussed below, they each include appropriate teeth for the purposes described herein. The gear member 134 is coupled to a first sliding plate 136 mounted within the horizontal frame member 18 and rotation of the gear member 134, in a clockwise direction as shown with reference to FIGS. 8A and 8B causes movement of a first sliding plate 136 in a direction away from the second end 30 of the horizontal frame member 18. The first sliding plate 136 is in turn coupled to a transfer gear 138 that transfers movement of the first sliding plate 136 to a second sliding plate 140 mounted within the horizontal frame member 18. The transfer gear 138 is configured such that movement of the first sliding plate 136 away from the second end 30 of the horizontal frame member 18 causes the second sliding plate 140 to move toward the second end 30 of the horizontal frame member 18. The second sliding plate 140 is coupled to first and second linkage arms 142, 144 respectively extending between the second sliding plate 140 and the first and second rear support arms 64, 66. Movement of the second sliding plate 140, and consequently the first and second linkage arms 64, 66, toward the second end 30 of the horizontal frame member 18 causes the first and second support arms 64, 66 to pivot in the same direction thereby drawing the first and second rear wheels 40, 42 inwardly as shown in FIGS. 13A&B and 14A&B. When the user desires to open the support assembly 12 to its use orientation, the process described above is reversed with the vertical frame member 16 being pivoted away from the horizontal frame member 18.

As discussed above, the vertical frame member 16 is also an elongated member having a first end 22 and a second end 24. The second end 24 of the vertical frame member 16 is provided with a handle 80 such that the shopping cart 10 may be easily maneuvered on a support surface when in its use orientation. As will be explained below in greater detail the handle 80 is pivotally secured to the vertical frame member 16 at the second end 24 thereof such that it can be selectively moved between a rearwardly facing, extended use position (as shown in FIGS. 1 to 6) and a collapsed position folded directly next to the second end 24 of the vertical frame member 16 (as shown in FIGS. 9B, 10B, 11B and 12B).

Figure 12B:
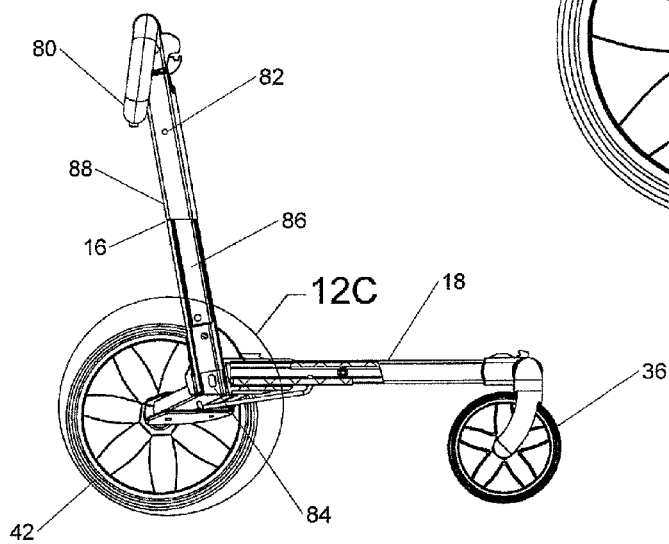
Figure 13B:
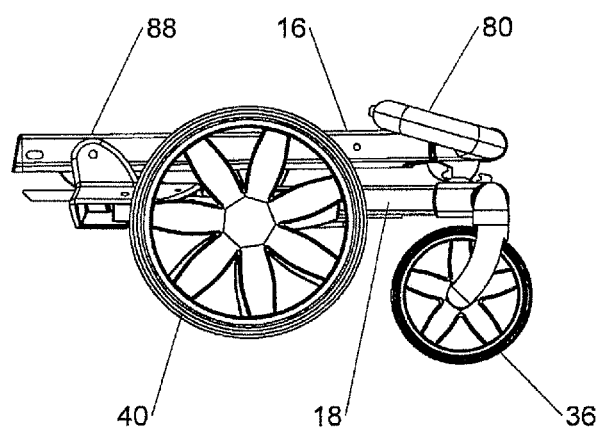

As will be appreciated based upon the following disclosure, the vertical frame member 16 is composed of telescoping upper and lower vertical frame components 86, 88. In accordance with a preferred embodiment, the upper vertical frame component 86 fits within the lower vertical frame component 88 such that the upper vertical frame component 86 may be selectively moved between its extended use position as shown in FIGS. 1 to 6, 10B and 11B and its collapsed storage position as shown in FIGS. 12B, 13B and 14B. Movement is controlled by a spring biased, moveable lock pin 82 extending between the upper vertical frame component 86 and the lower vertical frame component 88.

The shopping cart 10 is provided with a plurality of storage receptacles 44, 46 shaped and dimensioned for selective attachment to the support frame 14. The storage receptacles are identical and similar references numerals will therefore be used for the similar parts of the storage receptacle. The storage receptacles include a slight taper so they may be stacked in a nested arrangement. In accordance with a preferred embodiment, each of the storage receptacles 44, 46 is substantially rectangular with first and second long sides 90, 92 and first and second short sides 94, 96. Each of the short sides 94, 96 includes a receptacle handle 98 that is defined by a recess 58 formed in the wall of the short side 94, 96. In addition, each storage receptacle 44, 46 includes a set of handles 45, 47 that may be folded out for use.

In accordance with a preferred embodiment, a first storage receptacle 44 shaped and dimensioned for selective attachment adjacent to the upper surface 32 of the horizontal frame member 18. In particular, and with reference to FIG. 9, the upper surface 32 of the horizontal frame member 18 is provided with mounting bosses 130, 132 adjacent the first end 28 and the second end 30 of the horizontal frame member 18. The mounting bosses 130, 132 include either an inwardly or outwardly facing hook 131, 133 shaped and dimensioned to engage the bottom of the storage receptacle 44. In accordance with a preferred embodiment, the mounting boss 130 adjacent the first end 28 of the horizontal frame member 18 is statically mounted while the mounting boss 132 adjacent the second end 30 of the horizontal frame member 18 is resiliently biased for sliding movement relative to the horizontal frame member 18. In this way, the mounting boss 132 may move toward the first end 28 when it is desired to position the first storage receptacle 44 on the horizontal frame member 18 and move away from the first end 28 when it is desired to secure the first storage receptacle 44 on the horizontal frame member 18.

The shopping cart 10 is further provided with a second storage receptacle 46 shaped and dimensioned for selective attachment to the vertical frame member 16. In particular, the vertical frame member 16 is provided with first and second upper latch assemblies 108, 110. Each of the first and second latch assemblies 108, 110 are composed of a static upward facing hook member 112, 114 adjacent the second end 24 of the vertical frame member 16. The second storage receptacle 46 includes a recess 58, which formed part of the receptacle handle 98 for the second storage receptacle 46, shaped and dimensioned to receive the first and second upward facing hook members 112, 114 in a manner supporting the second storage receptacle 46 from vertical frame member 16. That is, the upward facing hook members 112, 114 fit within the recess 58 such that the receptacle handle 98 of the second storage receptacle 46 sits within the concave surface defined by the upward facing hook members 112, 114. Although the weight of the second storage receptacle 46 will maintain the second storage receptacle 46 within the upward facing hook members 112, 114, secure attachment is facilitated by providing each of the first and second upper latch assemblies 108, 110 with a pivoting latch member 116, 118 that effectively closes the supporting recess defined by the upward facing hook members 112, 114 by moving between an extended position in which the pivoting latch members 116, 118 cover the top of the supporting recess to enclose the receptacle handle 98 of the second storage receptacle 46 therein. When it is desired to remove the second storage receptacle 46, the pivoting latch members are 116, 118 are pressed inward opening the top of the supporting recess so it can be removed from the support assembly 12.

In its use orientation, the support assembly 12 is opened with the vertical frame member 16 obliquely oriented relative to the horizontal frame member 18. Similarly, the first and second front wheels 36, 38 are laterally oriented relative to the second end 30 of the horizontal frame member 18 and the first and second rear wheels 40, 42 laterally and longitudinally extend beyond the horizontal frame member 18. The first and second storage receptacles 44, 46 may be selectively secured to the support assembly 12 when in this orientation.

After the user has finished shopping, he or she may roll the shopping cart 10 to their car and simply remove the storage receptacles 44, 46 from the support assembly 12. The storage receptacles 44, 46 may then be placed in the trunk or rear space of the automobile. With the storage receptacles 44, 46 removed, the user may then proceed to fold the support assembly 12 to its storage orientation. Once in its storage orientation, the support assembly 12 may also be placed within the trunk or rear space of the automobile. Movement of the shopping cart 10 between its use orientation and its storage orientation may be repeated by the user as often as he or she desires.

Figure 10A:
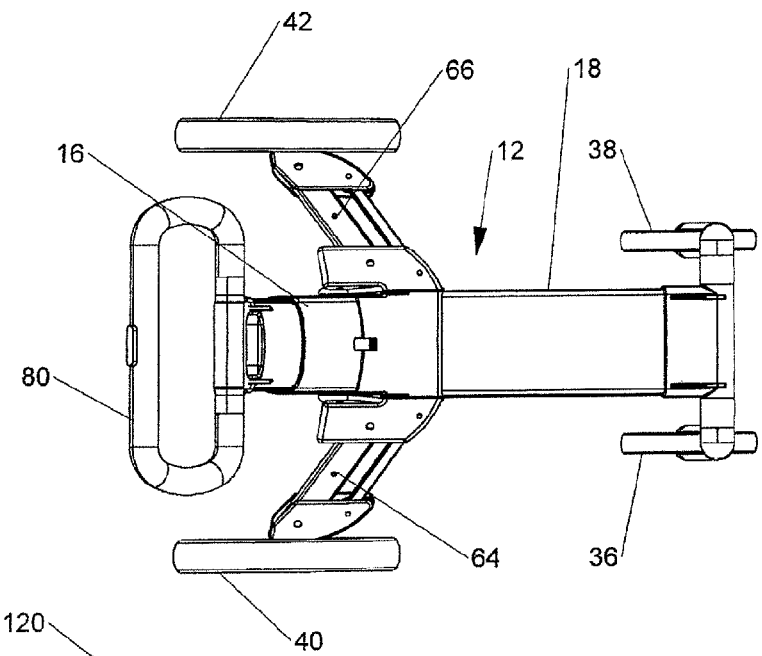
FIGS. 10A, 10B, 11A, 11B, 12A and 12B are top views and side views showing the support frame of the collapsible shopping cart shown in FIG. 1 in various stages of the collapse.
Figure 10B:
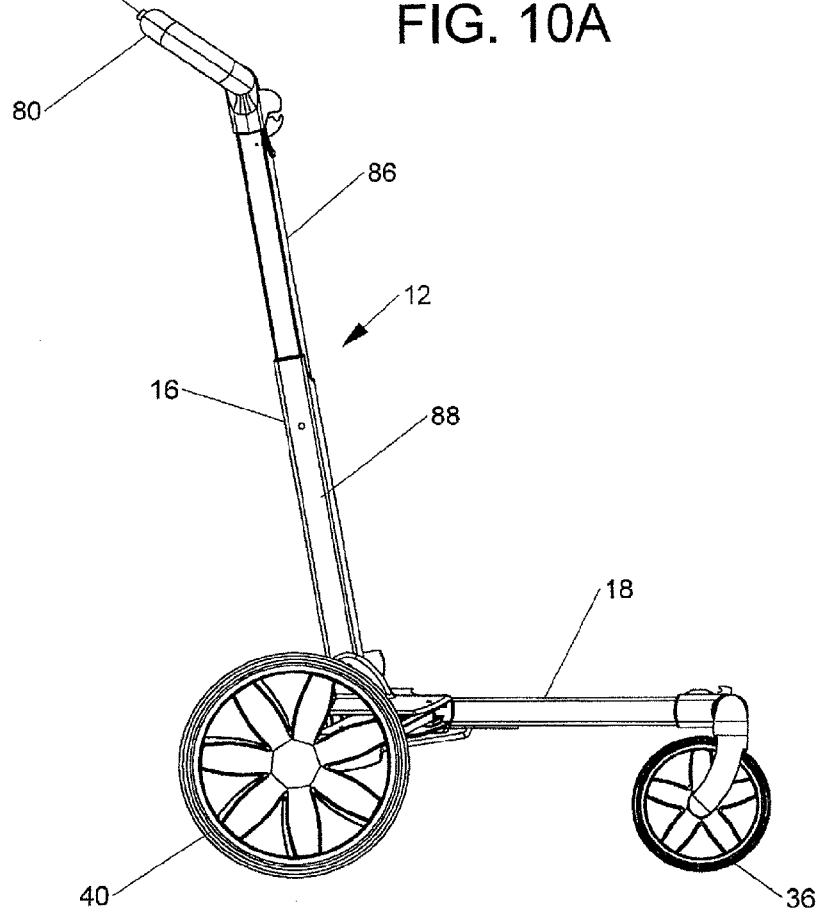

In particular, and with reference to FIGS. 10A, 10B, 11A, 11B, 12A, 12B, 13A, 13B, 14A and 14B, the process for folding the support assembly 12 is disclosed. Referring to FIGS. 10A and 10B, the shopping cart 10 is shown with the storage receptacles 44, 46 removed. In this use orientation, and with the horizontal frame member 18 supported on a flat supporting surface, the vertical frame member 16 extends upwardly with a slight incline.

The first step in collapsing the support assembly 12 is to tilt the handle 80 to its storage orientation. This is achieved by pressing upon a lock release 120 integrated with the handle 80 for permitting selective rotation of the handle 80 relative to the second end 24 of the vertical frame member 16. It is appreciated, this locking mechanism is a conventional design, for example, a cable release mechanism, although various locking mechanisms known to those skilled in the art could be employed within the spirit of the invention. See FIGS. 11A and 11B. Thereafter, and after it is confirmed the baskets have been removed, the lock pin 82 between the upper and lower vertical frame components 86, 88 is pressed allowing the upper vertical frame component 86 to telescopically move into the lower vertical frame component 88. Movement of the upper vertical frame component 86 to its storage position within the lower vertical frame component 88 causes release of a tilt lock pin 84 between the first end 22 of the vertical frame member 16 and the first end 28 of the horizontal frame member 18 permitting pivoting of the vertical frame member 16 relative to the horizontal frame member 18 as shown with reference to FIGS. 11A&B and 12A&B. In accordance with a preferred embodiment, and with reference to FIG. 12C, the tilt lock pin 84 rides in a groove that has a detent 122 in the end where a spring 124 pulls the tilt lock pin 84 into location and prevents tilt. When the upper vertical frame component 86 is completely lowered, the tilt lock pin 84 is pushed out of the detent 122 and will allow the vertical frame member 16 to pivot relative to the horizontal frame member 18 and fold forward.

Figure 12A:
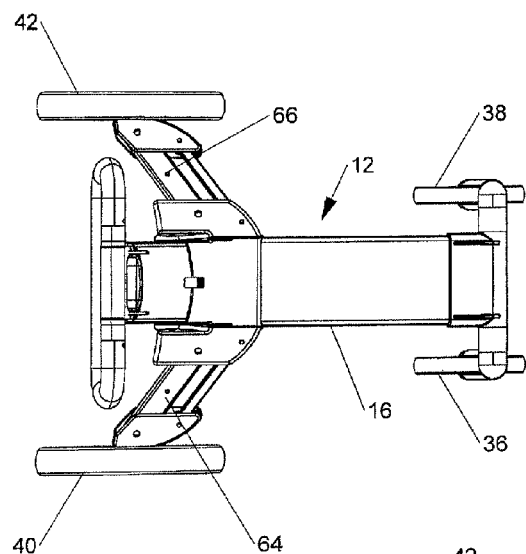
Figure 12C:
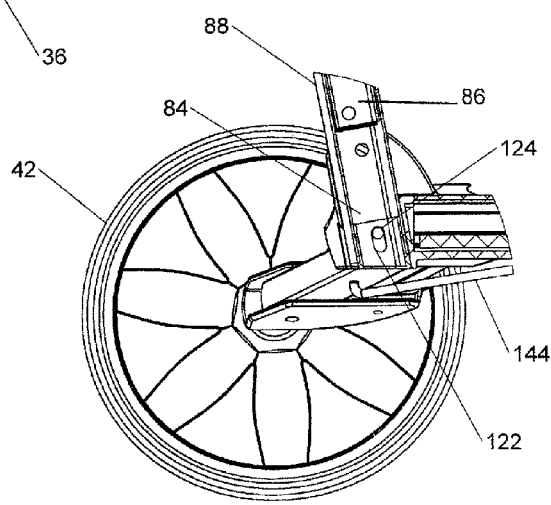
FIG. 12C is a detailed side view of the tilt lock pin assembly at the step associated with FIGS. 12A and 12B.

Referring to FIGS. 12A&B and 13A&B, as the vertical frame member 16 is folded relative to the horizontal frame member 18 the rear wheels 40, 42 are drawn toward the second end 30 of the horizontal frame member 18 and the body of the horizontal frame member 18. This movement is achieved under the control of the control lever 76 that is connected to the first and second rear support arms 64, 66 and the first and second rear wheels 40, 42 by a linkage assembly 78. In addition, to folding the first and second rear wheels 40, 42 to a storage orientation, the first and second front wheels 36, 38 are provided with a pivot allowing the first and second front wheels 36, 38 to rotate about an axis perpendicular to the longitudinal axis of the horizontal frame member 18 to further reduce the volumetric foot print of the support assembly 12. See FIGS. 14A and 14B.

Figure 14A:
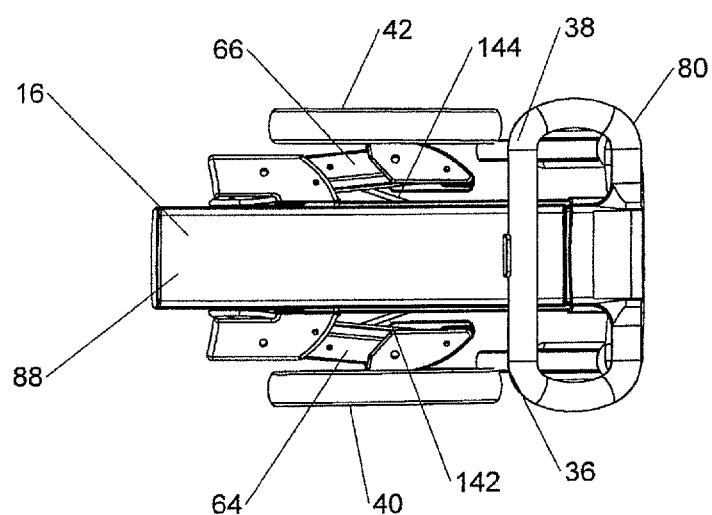
Figure 14B:
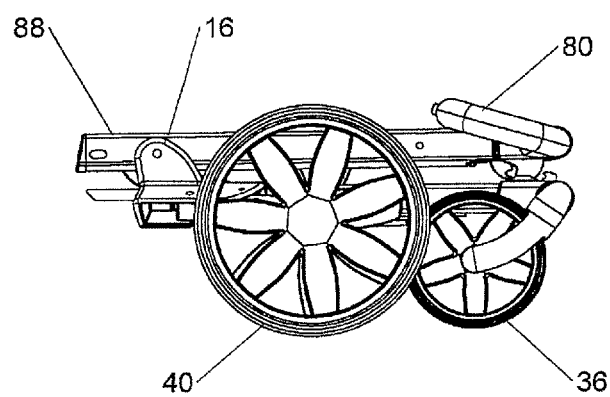
Figure 15:
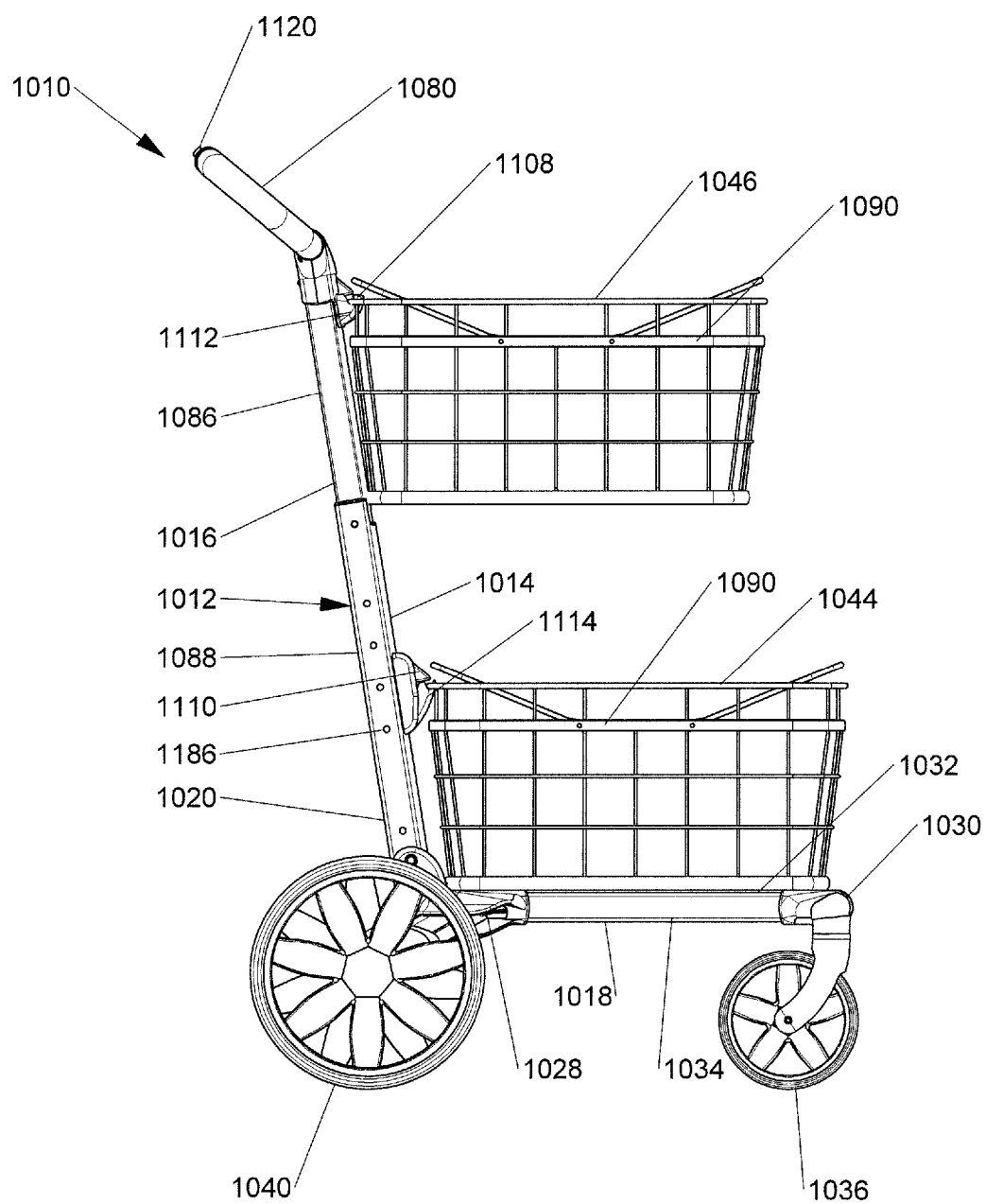
FIG. 15 is a side plan view of an alternate embodiment of the present collapsible shopping cart.
Figure 16:
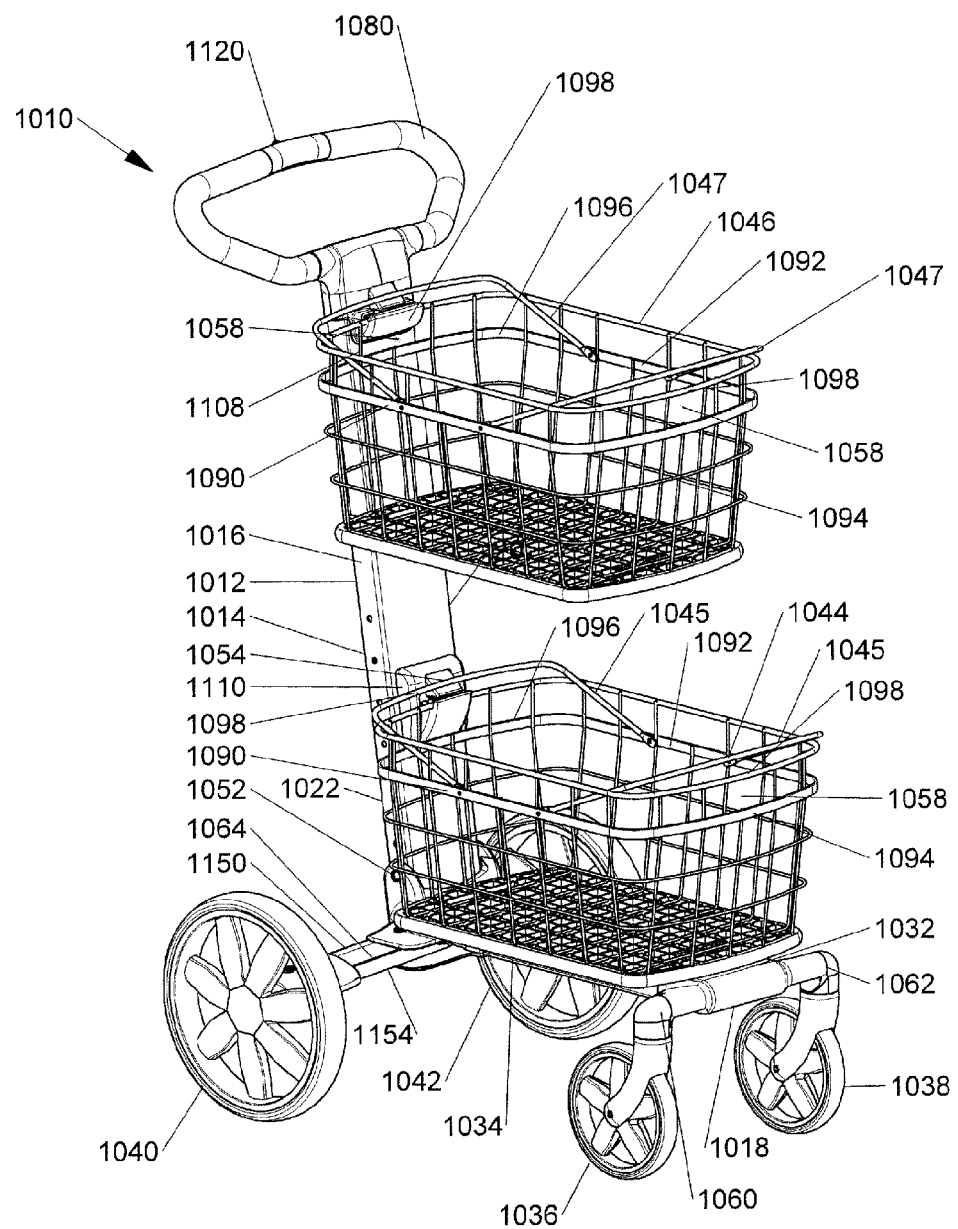
FIG. 16 is a perspective view of the collapsible shopping cart shown in FIG. 15.
Figure 17:
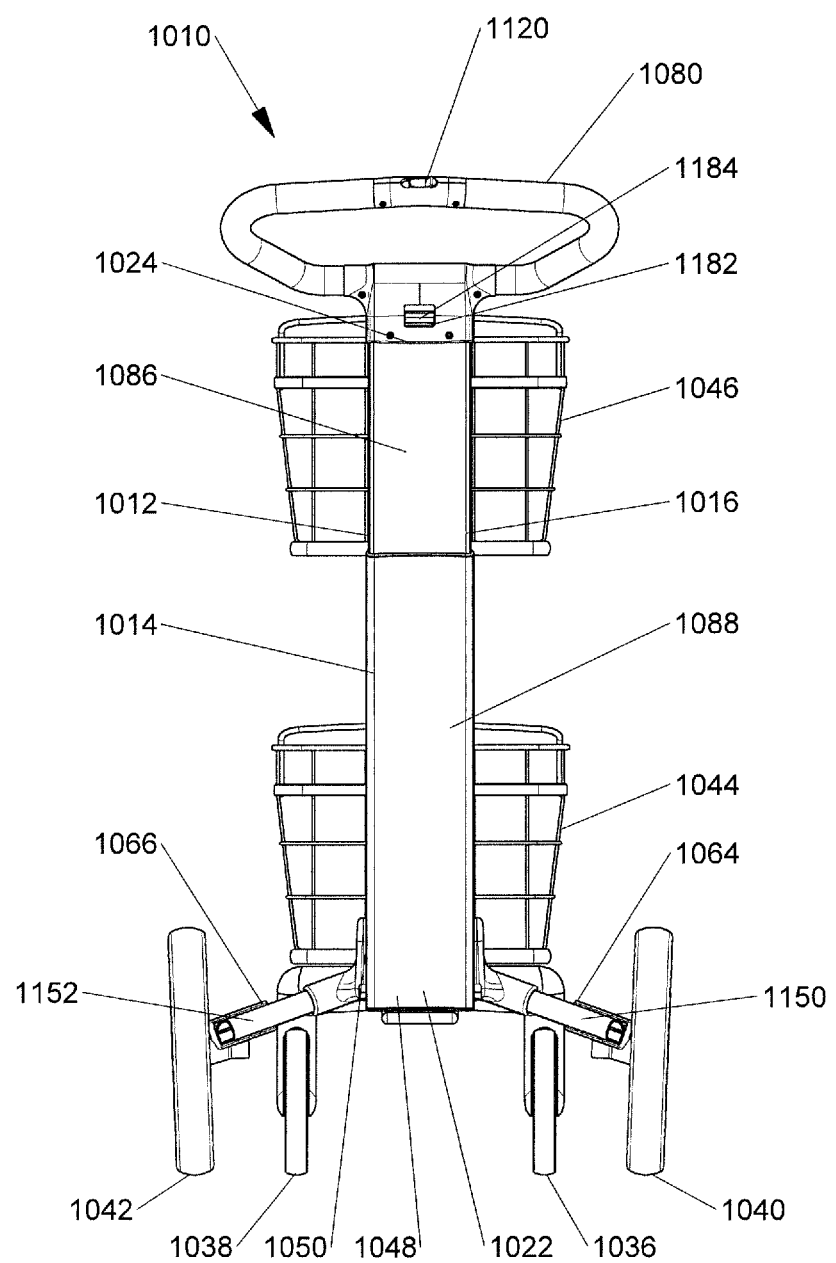
FIG. 17 is a rear plan view of the collapsible shopping cart shown in FIG. 15.
Figure 18:
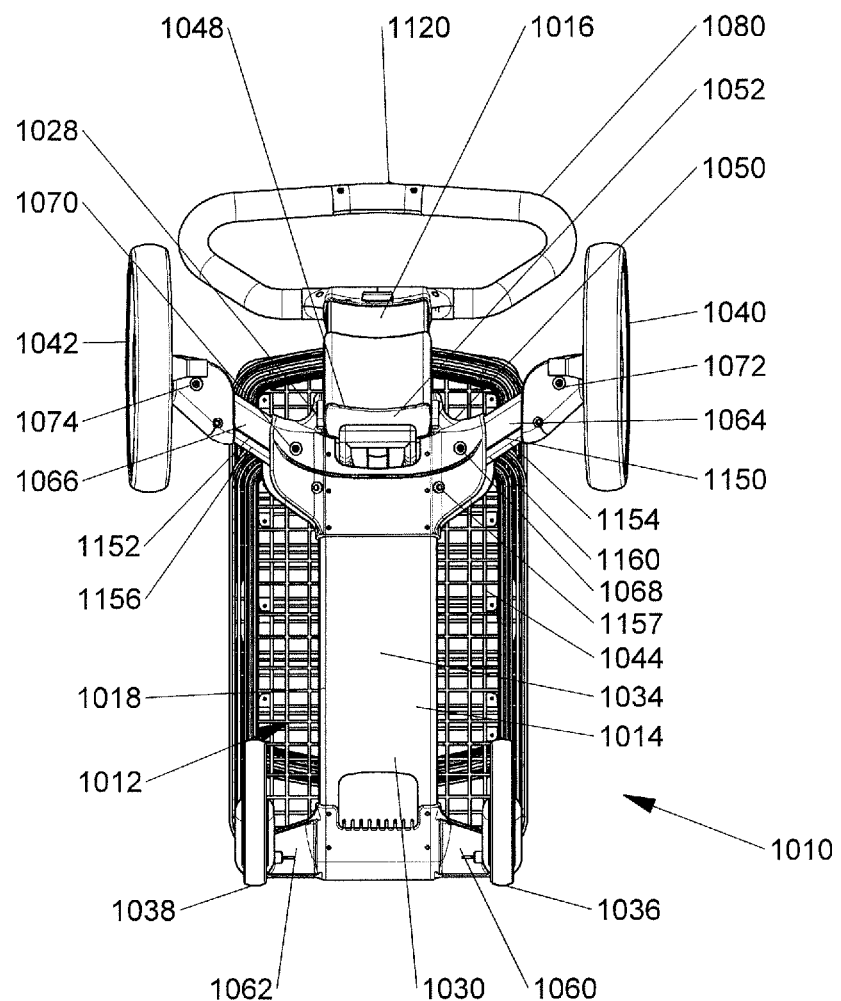
FIG. 18 is a bottom view of the collapsible shopping cart shown in FIG. 15.
Figure 19:
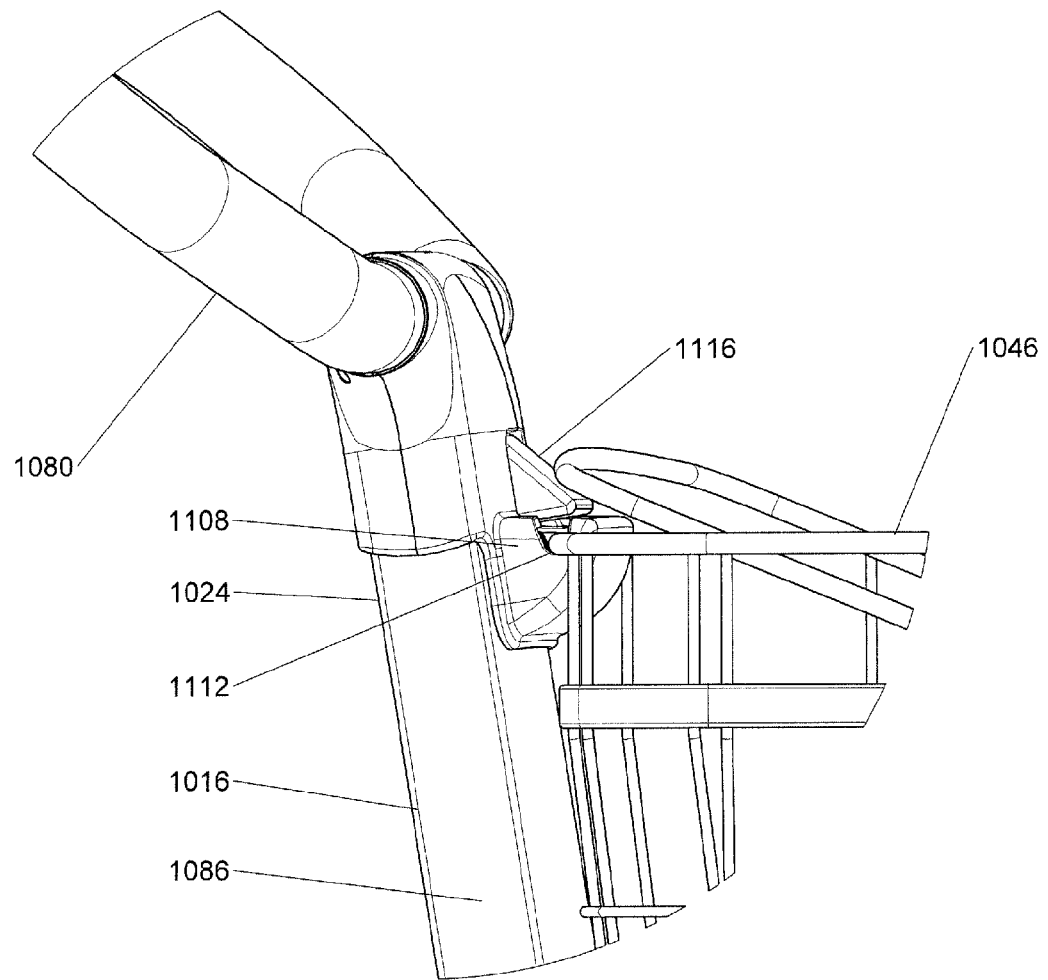
FIGS. 19 and 20 are detailed side views showing attachment of a storage receptacle to the support frame of the collapsible shopping cart shown in FIG. 15.
Figure 20:
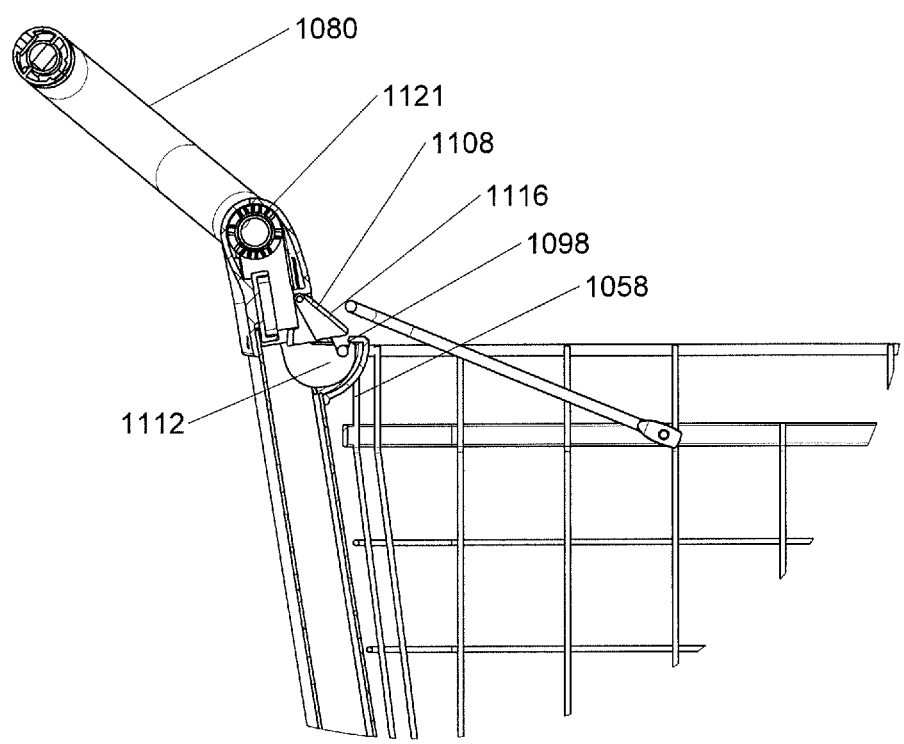
Figure 21:
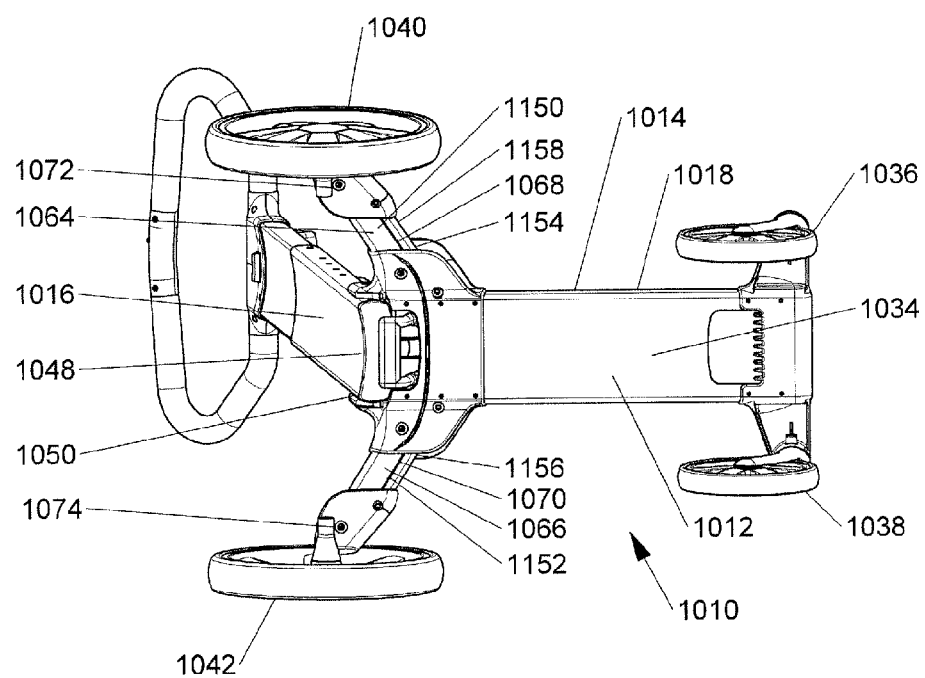
FIG. 21 is a detailed bottom view of the collapsible shopping cart shown in FIG. 15.
Figure 22:
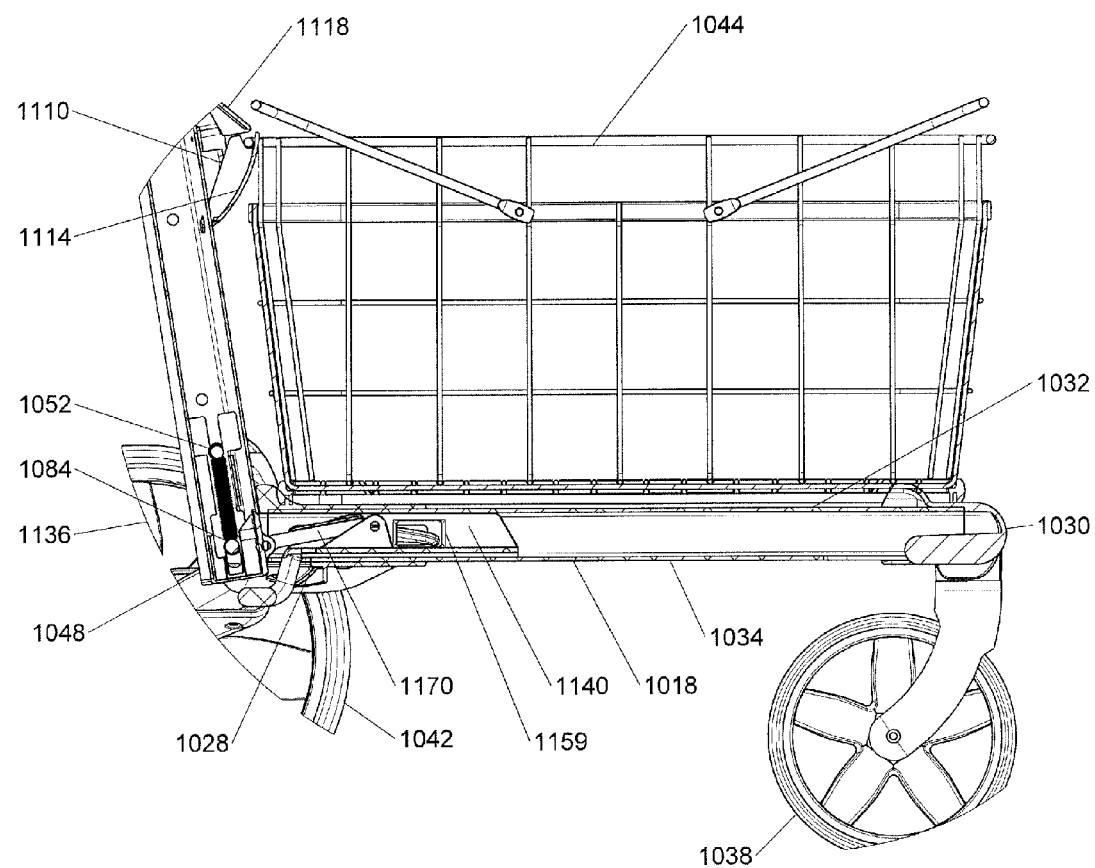
FIG. 22 is a detailed side cross sectional view showing the mechanism for attachment of the first storage receptacle to the horizontal frame member of the collapsible shopping cart shown in FIG. 15.
Figure 23A:
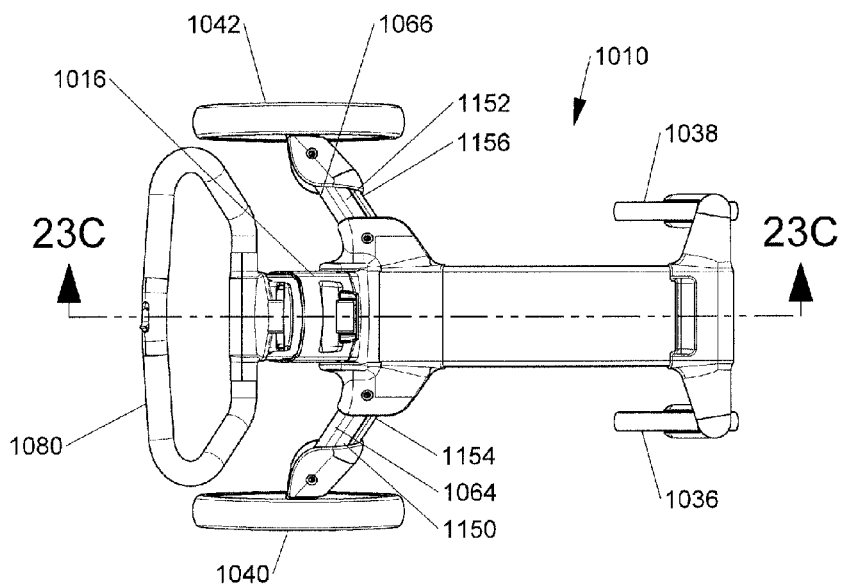
FIGS. 23A-E are respectively a top view, a detailed cross sectional view, a cross sectional view, a perspective view and a detailed view showing the linkage assembly employed in movement of the first and second rear wheels in the collapsible shopping cart shown in FIG. 15.
Figure 23B:
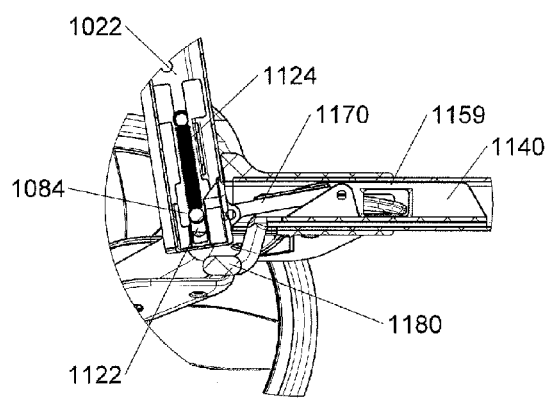
Figure 23C:
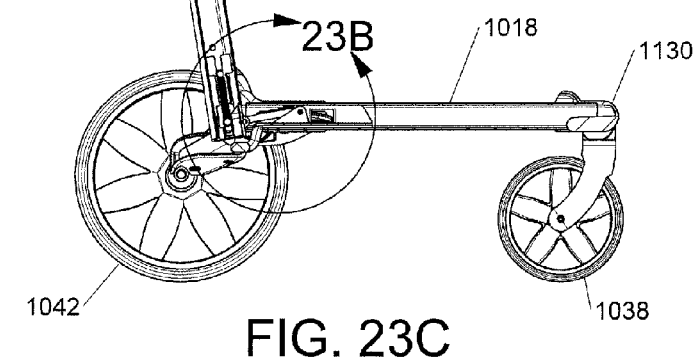
Figure 23D:
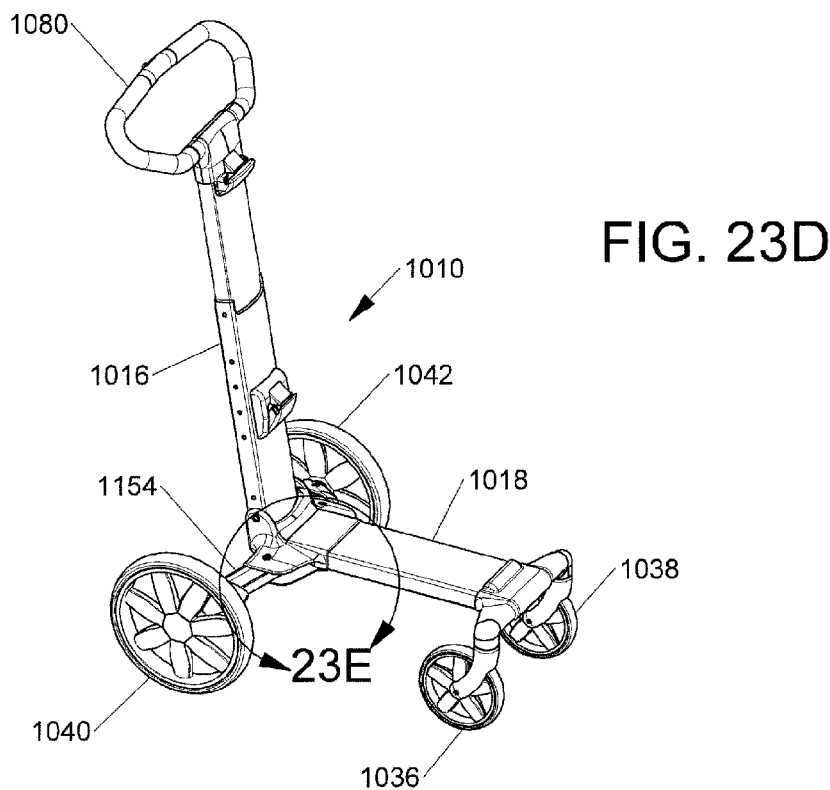
Figure 23E:
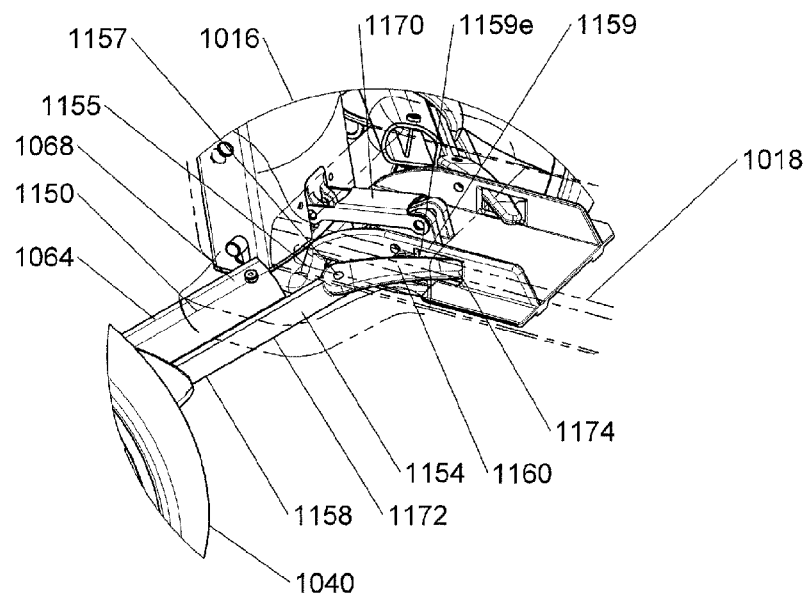

Once in the storage orientation shown in FIGS. 14A and 14B, the support assembly 12 is ready for placement within the trunk of an automobile or some other storage place.

Using the present collapsible shopping cart 10, the shopper can simplify the complicated shopping process outlined in the Background section. In particular, the shopper removes the present shopping cart 10 from the automobile and assembles the shopping cart 10 with the storage receptacles 44, 46. The shopper then chooses and scans item(s) using store scanner or smart phone with scanning applications (some produce requires weighing and coding) and places the item(s) in the storage receptacles 44, 46 of the present shopping cart 10 where the item(s) may remain unhandled until the shopper is home. The shopper may also retrieve a shopping list using the scanner and then pay. The shopper then takes the present shopping cart 10 out to his/her automobile. The shopper then disengages the storage receptacles 44, 46 and places them in the automobile. The shopper then folds the present support assembly 12 and places it in the automobile. Once home, the shopper reassembles the shopping cart 10 with the storage receptacles 44, 46 and pushes them into the house, condo, office or apartment building. The shopper may then place the item(s) in storage (within or removed from the storage receptacles) and use the shopping cart 10 as extra storage or return it to automobile.

In accordance with another embodiment of the present invention, and with reference to FIGS. 15 to 27, a collapsible shopping cart 1010 is disclosed. The collapsible shopping cart 1010 of this embodiment is similar to that disclosed above, but includes alternate structures relating to the support of the first and second storage receptacles 1044, 1046, the folding mechanism, and the mechanism for collapse of the upper vertical frame component 1086 and lower vertical frame component 1088. As such, and unless otherwise specified herein the functioning of the collapsible shopping cart is the same as described above.

The collapsible support assembly 1012 of the shopping cart 1010 includes a support frame 1014. The support frame 1014 is composed of a vertical (or first) frame member 1016 and a horizontal (or second) frame member 1018. The vertical frame member 1016 is pivotally secured to the horizontal frame member 1018 allowing the support frame 1014 to be selectively folded between a use orientation and a storage orientation. The vertical frame member 1016 is an elongated member 1020 having a first end 1022 and a second end 1024. The horizontal frame member 1018 is an elongated member 1026 having a first end 1028 and a second end 1030, as well as an upper surface 1032 and a lower surface 1034. The first end 1022 of the vertical frame member 1016 is pivotally connected to the first end 1028 of the horizontal frame member 1018.

A plurality of wheels 1036, 1038, 1040, 1042 are coupled to the horizontal frame member 1018 for movement between a use orientation and a storage orientation, wherein when the plurality of wheels 1036, 1038, 1040, 1042 are in the use orientation they extend from the horizontal frame member 1018 in a manner permitting engagement with a horizontal support surface such that the support assembly 1012 may roll or slide thereupon.

The shopping cart 1010 also includes a first storage receptacle 1044 shaped and dimensioned for selective attachment adjacent the upper surface 1032 of the horizontal frame member 1018 and a second storage receptacle 1046 shaped and dimensioned for selective attachment to the vertical frame member 1016.

The present shopping cart 1010 provides a sturdy and appealing collapsible shopping cart 1010 for collecting, holding, and transporting items purchased at a retail outlet to an automobile and then into a house, apartment, condo/office, etc. The present shopping cart 1010 also provides a mechanism to transport items via foot in walkable communities.

As discussed above, the support frame 1014 is collapsible between a use orientation and storage orientation. Movement between these orientations is generally achieved by pivotally connecting the vertical frame member 1016 to the horizontal frame member 1018. The first end 1022 of the vertical frame member 1016 is provided with a projection 1048 shaped and dimensioned to fit within a recess 1050 formed in the first end 1028 of the horizontal frame member 1018. A pivot pin 1052 couples the projection 1048 within the recess 1050 such that the vertical frame member 1016 and the horizontal frame member 1018 may pivot relative to each other.

The pivot pin 1052 includes a longitudinal axis that is oriented substantially perpendicular to the longitudinal axes of both the vertical frame member 1016 and the horizontal frame member 1018. In this way, the vertical frame member 1016 is folded upon the horizontal frame member 1018 when the support frame 1014 is moved between its use orientation and its storage orientation. In particular, the vertical frame member 1016 and the horizontal frame member 1018 move between a relative position where the longitudinal axis of the vertical frame member 1016 and the longitudinal axis of the horizontal frame member 1018 are in a slightly obtuse angular orientation when the shopping cart 1010 is in its use orientation and a relative position where the longitudinal axis of the vertical frame member 1016 and the longitudinal axis of the horizontal frame member 1018 are in a substantially parallel orientation when the shopping cart 1010 is in its storage orientation. The support frame 1014 is secured, but selectively, held in the respective use orientation and storage orientation by various latching structures, for example, the lock release mechanism 1182 that allows for selective engagement between the lower vertical frame component 1088 and that the upper vertical frame component 1086, and the tilt lock pin 1084 secured between the vertical frame member 1016 and the horizontal frame member 1018 discussed below in greater detail.

Extending from the horizontal frame member 1018 are a plurality of wheels 1036, 1038, 1040, 1042. In accordance with a preferred embodiment, the horizontal frame member 1018 is a provided with first and second front wheels 1036, 1038 and first and second rear wheels 1040, 1042. The first and second front wheels 1036, 1038 are pivotally coupled to the second end 1030 of the horizontal frame member 1018 on opposite sides thereof. The first and second rear wheels 1040, 1042 are pivotally coupled to the first end 1028 of the horizontal frame member 1018 on opposite sides thereof.

The first and second front wheels 1036, 1038 are respectively supported by first and second front support arms 1060, 1062 which extend laterally from opposite sides of the horizontal frame member 1018 at the second end 1030 of the horizontal frame member 1018. The first and second front wheels 1036, 1038 are pivotally secured to the first and second front support arms 1060, 1062 in a manner allowing the first and second front wheels 1036, 1038 to swivel relative thereto. More particularly, each of the first and second front support arms 1060, 1062 includes a longitudinal axis that extends perpendicular to the longitudinal axis of the horizontal frame member 1018 and thereby supports the first and second front wheels 1036, 1038 positioned beyond the lateral extent of the horizontal frame member 1018. This orientation adds to the stability of the overall shopping cart 1010 when in its use orientation. In addition, the first and second front wheels 1036, 1038 are releasably secured to the first and second front support arms 1060, 1062 in a manner allowing the first and second front wheels 1036, 1038 to be selectively removed from the first and second front support arms 1060, 1062. It is appreciated that a variety of known attachment structures may be used for releasably securing the wheels. Such structures allow for easy removal without use of tools and function to reduce the volumetric footprint of the folded frame by permitting removal of the wheels.

The first and second rear wheels 1040, 1042 are respectively supported by first and second rear support arms 1064, 1066 which extend obliquely from opposite sides of the horizontal frame member 1018 at the first end 1028 of the horizontal frame member 1018 such that the first and second rear wheels 1040, 1042 are supported in a position beyond both the lateral and longitudinal extent of the horizontal frame member 1018. More particularly, each of the first and second rear support arms 1064, 1066 includes a first end 1068, 1070 pivotally secured to the horizontal frame member 1018 and second end 1072, 1074 to which the respective first and second rear wheels 1040, 1042 are secured. The first ends 1068, 1070 of the respective first and second rear support arms 1064, 1066 are pivotally secured to the first end 1028 of the horizontal frame member 1018 so as to pivot about an axis that is substantially perpendicular to the longitudinal axis of the horizontal frame member 1018 and substantially perpendicular to the axes of the first and second rear support arms 1064, 1066. As with the first and second front wheels 1036, 1038, the first and second rear wheels 1040, 1042 are releasably secured to the first and second rear support arms 1064, 1066 to be selectively removed from the first and second rear support arms 1064, 1066.

Given the axis about which the first and second rear support arms 1064, 1066 rotate, the first and second rear support arms 1064, 1066, as well as the first and second rear wheels 1040, 1042, are designed to rotate between a use orientation in which the first and second rear wheels 1040, 1042 are supported in a position beyond both the lateral and longitudinal extent of the horizontal frame member 1018 and a storage positioned in which the first and second rear wheels 1040, 1042 are held adjacent the horizontal frame member 1018.

Controlled movement is achieved by the provision of first and second parallelogram (or four bar) linkage assemblies 1150, 1152 associated with each of the first and second rear wheels 1040, 1042. It is appreciated, the linkage assemblies 1150, 1152 associated with the first and second rear wheels 1040, 1042 are identical and only the first linkage assembly 1150 associated with the first rear wheel 1040 will be described in detail herein.

The first linkage assembly 1150 is composed of the first rear support arm 1064 and a first front parallelogram arm 1154 (the second front parallelogram arm 1156 extends between the horizontal frame member 1018 and the second rear wheel 1042) extending substantially parallel to the first rear support arm 1064. The second ends 1072, 1158 of the respective first rear support arm 1064 and the first front parallelogram arm 1154 are pivotally connected to the first rear wheel 1040. The first end 1068 of the first rear support arm 1064 is pivotally connected to the first end 1028 of the horizontal frame member 1018. The first end 1160 of the first front parallelogram arm 1154 is pivotally coupled to the frame at a pivot point 1157.

A portion of the first front parallelogram arm 1154 at the first end 1160 thereof extends beyond the pivot point 1157, that is, an elongated tip member 1174 extends beyond the pivot point 1157. The elongated tip member 1174 extends through a slot or window 1155 formed in the horizontal frame member 1018 and through a slot or window 1159 formed in the slide plate 1140 mounted within the horizontal frame member 1018 for longitudinal motion relative thereto. The passage of the elongated tip member 1174 through the window 1155 of the horizontal frame member 1018 and through the window 1159 formed in a slide plate 1140 allows the elongated tip member 1174 to come into engagement with the slide plate 1140 as it moves in accordance with the present invention.

In particular, the first front parallelogram arm 1154 is coupled to the horizontal frame member 1018 adjacent its first end 1160 such that a portion of the first front parallelogram arm 1154 at the first end 1160 thereof extends through the window 1155 of the horizontal frame member 1018 and the window 1159 of the slide plate 1140, and into the interior space defined by the horizontal frame member. The window 1155 of the horizontal frame member 1018 is sized to allow for free movement of the elongated tip member 1174, and ultimately the first front parallelogram arm 1154, while the window 1159 of the slide plate 1140 is sized to engage the elongated tip member 1174, and ultimately the first front parallelogram arm 1154, to control movement of the first front parallelogram arm 1154 as the vertical frame member 1016 and the horizontal frame member 1018 are folded.

As such, when the slide plate 1140 is moved rearwardly when the vertical frame member 1016 and folded toward the horizontal frame member 1018, positive contact between the slide plate 1140, in particular, an edge 1159$e$ of the window 1159, and the distal elongated tip member 1174 of the first front parallelogram arm 1154 is made. During the sliding motion of the sliding plate 1140, the first front parallelogram arm 1154 is pushed but can also move back within the space of the window 1159. As such, and as explained below in greater detail, when the slide plate 1140 is pulled rearwardly (that is, the slide plate 1140 is pulled toward the first end 1028 of the horizontal frame member 1018 or toward the pivotal connection of the vertical frame member 1016 and the horizontal frame member 1018) the linkage assembly 1150 moves the first rear wheel 1040 in an arcuate motion toward the second end 1030 of the horizontal frame member 1018.

Figure 25A:
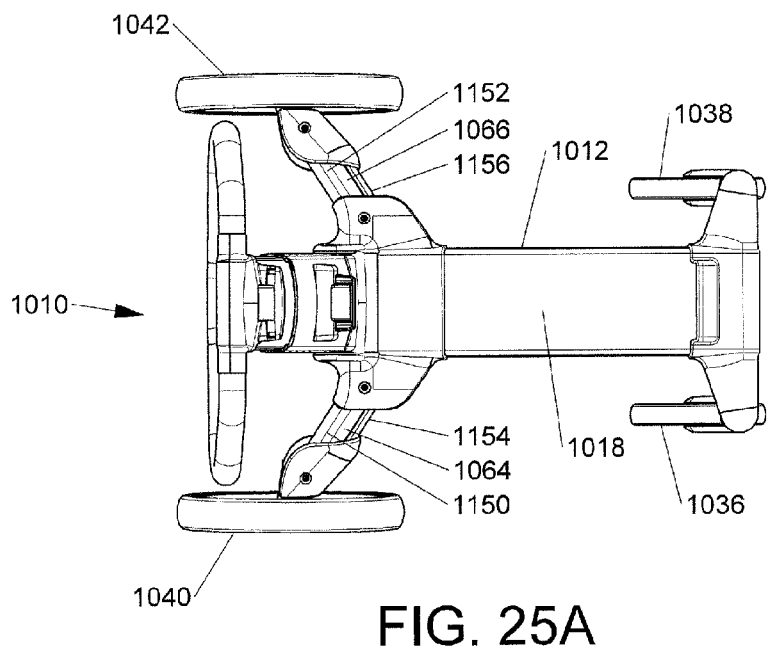
Figure 25B:
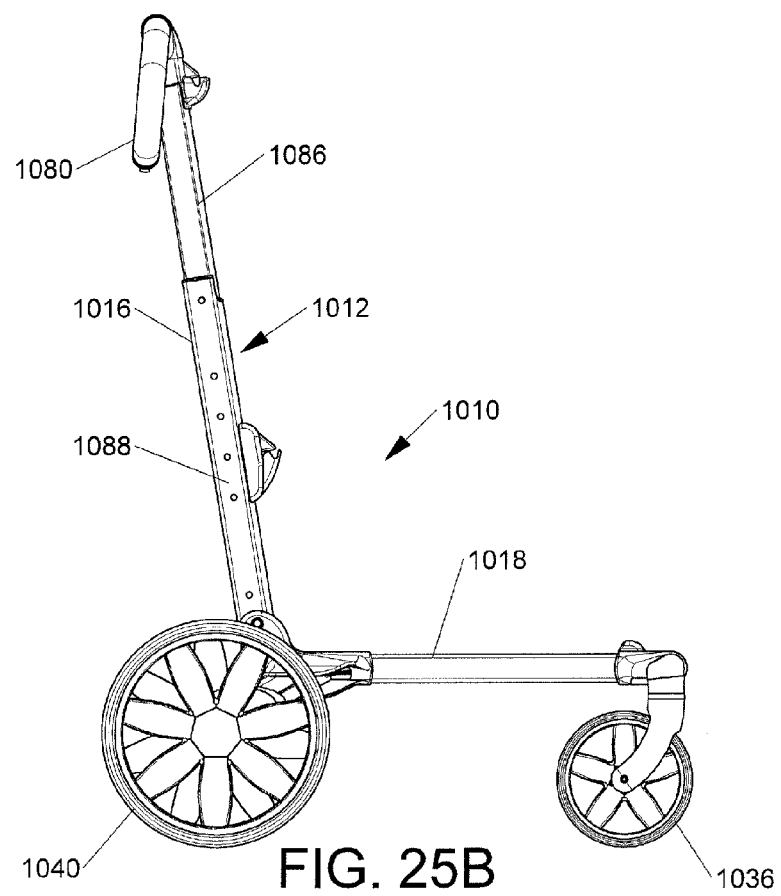

As such, and as will be discussed below in greater detail, upon movement of upper vertical frame component 1086 to its storage position within the lower vertical frame component 1088 the tilt lock pin 1084 is moved to its release position permitting pivoting of the vertical frame member 1016 relative to the horizontal frame member 1018 as shown with reference to FIGS. 25A&B and 26A,B&C. During movement to the storage orientation, after the upper vertical frame component 1086 is moved downward within the lower vertical frame component 1088 and the tilt lock pin 1084 is moved to its release position, the vertical frame member 1016 may be rotated relative to the horizontal frame member 1018, in particular, toward the horizontal frame member 1018. As the vertical frame member 1016 is rotated toward the horizontal frame member 1018, a connection link 1170 pivotally connected between the slide plate 1140 and the first end 1022 of the vertical frame member 1016 is manipulated. In particular, forward rotation of the vertical frame member 1016 causes the connection link 1170 to pull upon the slide plate 1140 in a manner that draws the slide plate 1140 rearwardly, that is, toward the pivotal connection between the vertical frame member 1016 and the horizontal frame member 1018 in a direction away from the second end 1030 of the horizontal frame member 1018. Movement in this manner causes the linkage assemblies 1150, 1152 to move the first and second rear wheels 1040, 1042 in an arcuate motion toward the second end 1030 of the horizontal frame member 1018 until such a time that the first and second rear wheels 1040, 1042 are positioned adjacent to the horizontal frame member 1018 in their collapsed storage positions.

More particularly, the rearward motion of the slide plate 1140 acts upon the first and second front parallelogram arms 1154, 1156 in such a way to cause movement of the first and second linkage assemblies 1150, 1152 for effectuating movement of the first and second rear wheels 1040, 1042. The slide plate 1140 is further provided with a rearwardly projecting (that is extending in the direction of the first end 1028 of the horizontal frame member 1018) leg assembly 1180 so that the cart can be supported in a vertical orientation when in its collapsed configuration.

It is further appreciated that this pivotal movement of the linkage assemblies 1150, 1152 is further enhanced by structuring the first and second front parallelogram arms 1154, 1156 in a two-part construction, that is, a first member 1172 and a second member (or elongated tip member) 1174 angularly oriented (but fixedly and rigidly structured) to enhance the overall movement of the linkage assembly. This structure further keeps the rear wheels 1040, 1042 oriented properly for usage in accordance with the present invention.

When the user desires to open the support assembly 1012 to its use orientation, the process described above is reversed with the vertical frame member 1016 being pivoted away from the horizontal frame member 1018.

As discussed above, the vertical frame member 1016 is also an elongated member having a first end 1022 and a second end 1024. The second end 1024 of the vertical frame member 1016 is provided with a handle 1080 such that the shopping cart 1010 may be easily maneuvered on a support surface when in its use orientation. As will be explained below in greater detail the handle 1080 is pivotally secured to the vertical frame member 1016 at the second end 1024 thereof such that it can be selectively moved between a rearwardly facing, extended use position (as shown in FIGS. 15 to 20) and a collapsed position folded directly next to the second end 1024 of the vertical frame member 1016 (as shown in FIGS. 27A-D).

As will be appreciated based upon the following disclosure, the vertical frame member 1016 is composed of telescoping upper and lower vertical frame components 1086, 1088. In accordance with a preferred embodiment, the upper vertical frame component 1086 fits within the lower vertical frame component 1088 such that the upper vertical frame component 1086 may be selectively moved between its extended use position as shown in FIGS. 15-20, 23A-E, 24A&B and 25A&B and its collapsed storage position as shown in FIGS. 27A-D. Movement is controlled by a spring biased, lock release mechanism 1182 that allows for selective engagement between the lower vertical frame component 1088 and the upper vertical frame component 1086.

The vertical frame member 1016 is also provided with a multiple lock locations along its length so as to accommodate users of different heights. Adjustments in height are facilitated by a lock release mechanism 1182 that allows for selective engagement between the lower vertical frame component 1088 and that the upper vertical frame component 1086 via a latch assembly 1184 in the upper vertical frame components 1086 and a plurality of longitudinally positioned latch holes 1186 in the lower vertical frame component 1088. It is further appreciated that adjustments in height and ergonomics may be achieved by the tilting of the handle 1080.

The shopping cart 1010 is provided with a plurality of storage receptacles 1044, 1046 shaped and dimensioned for selective attachment to the support frame 1014. The storage receptacles are identical and similar reference numerals will therefore be used for the similar parts of the storage receptacle. The storage receptacles include a slight taper so they may be stacked in a nested arrangement. In accordance with a preferred embodiment, each of the storage receptacles 1044, 1046 is substantially rectangular with first and second long sides 1090, 1092 and first and second short sides 1094, 1096. Each of the short sides 1094, 1096 includes a receptacle handle 1098 that is defined by a recess 1058 formed in the wall of the short side 1094, 1096. In accordance with this embodiment, the walls of the storage receptacles are constructed from a wire lattice, and are, therefore, provided with an open construction. In addition, each storage receptacle 1044, 1046 includes a set of handles 1045, 1047 that may be folded out for use.

In accordance with a preferred embodiment, the first and second storage receptacle 1044, 1046 are shaped and dimensioned for selective attachment adjacent to first and second latch assemblies 1108, 1110 formed along the vertical frame member 1016 at positions adjacent the top and bottom thereof. Each of the first and second latch assemblies 1108, 1110 are composed of a laterally elongated static upward facing hook member 1112, 1114. Due to the elongated nature of the upward facing hook members 1112, 1114 the first and second storage receptacles 1044, 1046 are support in a stable manner.

As discussed above, each of the first and second storage receptacle 1044, 1046 includes a recess 1058 shaped and dimensioned to receive the first and second upward facing hook members 1112, 1114 in a manner supporting the first and second storage receptacles 1044, 1046 from vertical frame member 1016. That is, the upward facing hook members 1112, 1114 fit within the recess 1058 such that the receptacle handle 1098 of the first and second storage receptacles 1044, 1046 sits within the concave surface defined by the upward facing hook members 1112, 1114. Although the weight of the first and second storage receptacles 1044, 1046 will maintain the first and second storage receptacles 1044, 1046 within the upward facing hook members 1112, 1114, secure attachment is facilitated by providing each of the first and second latch assemblies 1108, 1110 with a pivoting latch member 1116, 1118 that effectively closes the supporting recess defined by the upward facing hook members 1112, 1114 by moving between an extended position in which the pivoting latch members 1116, 1118 cover the top of the supporting recess to enclose the receptacle handle 1098 of the first and second storage receptacles 1044, 1046 therein. When it is desired to remove the first and second storage receptacles 1044, 1046, the pivoting latch members 1116, 1118 are pressed inward opening the top of the supporting recess so they can be removed from the support assembly 1012.

In its use orientation, the support assembly 1012 is opened with the vertical frame member 1016 obliquely oriented relative to the horizontal frame member 1018. Similarly, the first and second front wheels 1036, 1038 are laterally oriented relative to the second end 1030 of the horizontal frame member 1018 and the first and second rear wheels 1040, 1042 laterally and longitudinally extend beyond the horizontal frame member 1018. The first and second storage receptacles 1044, 1046 may be selectively secured to the support assembly 1012 when in this orientation.

After the user has finished shopping or otherwise used the shopping cart, he or she may roll the shopping cart 1010 to their destination and simply remove the storage receptacles 1044, 1046 from the support assembly 1012. The storage receptacles 1044, 1046 may then be placed in the trunk or rear space of the automobile (or other location where the user might wish to place the cart). With the storage receptacles 1044, 1046 removed, the user may then proceed to fold the support assembly 1012 to its storage orientation. Once in its storage orientation, the support assembly 1012 may also be placed within the trunk or rear space of the automobile. Movement of the shopping cart 1010 between its use orientation and its storage orientation may be repeated by the user as often as he or she desires.

Figure 24A:
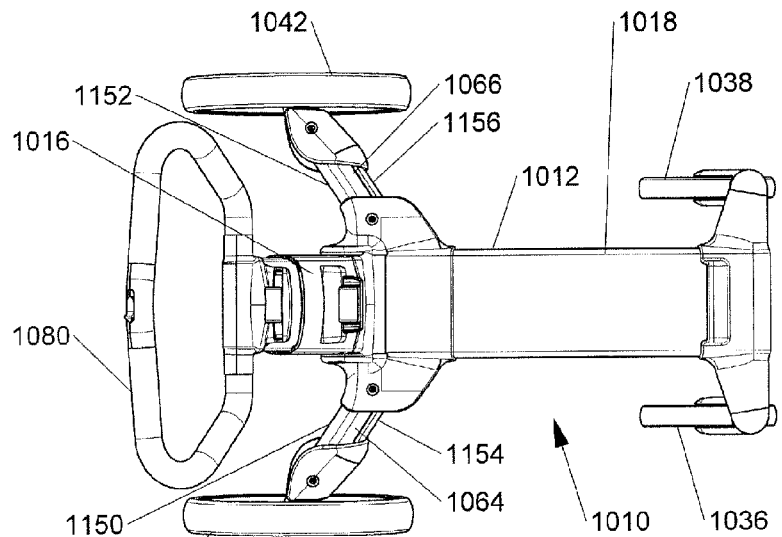
FIGS. 24A, 24B, 25A, 25B, 26A, 26B, 26C, 27A, 27B, 27C & 27D are various views of the collapsible shopping cart in various stages of collapse.
Figure 24B:
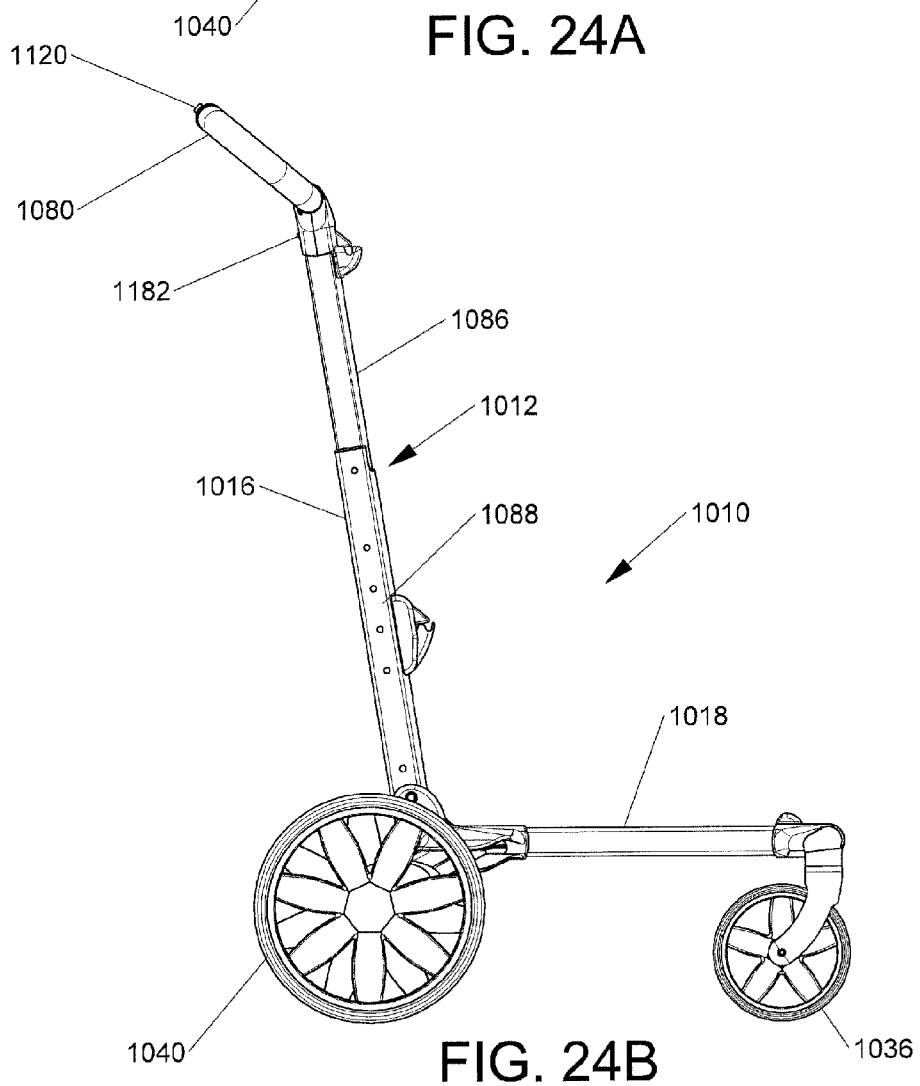

In particular, and with reference to FIGS. 24A, 24B, 25A, 25B, 26A, 26B, 27A, and 27B, the process for folding the support assembly 1012 is disclosed. Referring to FIGS. 24A and 24B, the shopping cart 1010 is shown with the storage receptacles 1044, 1046 removed. In this use orientation, and with the horizontal frame member 1018 supported on a flat supporting surface, the vertical frame member 1016 extends upwardly with a slight incline.

The first step in collapsing the support assembly 1012 is to confirm the baskets, that is, the first and second storage receptacles 1044, 1046, have been removed. After it is confirmed that the baskets have been removed, and as with the prior embodiment, the handle 1080 may be pivoted to a storage position by pressing upon a lock release 1120 integrated with the handle 1080 for releasing the handle pivot 1121 permitting selective rotation of the handle 1080 relative to the second end 1024 of the vertical frame member 1016 (see FIGS. 25A&B). Thereafter, the lock release mechanism 1182 is actuated allowing the upper vertical frame component 1086 to telescopically move into the lower vertical frame component 1088. Movement of the upper vertical frame component 1086 to its storage position within the lower vertical frame component 1088 causes release of a tilt lock pin 1084 between the first end 1022 of the vertical frame member 1016 and the first end 1028 of the horizontal frame member 1018 permitting pivoting of the vertical frame member 1016 relative to the horizontal frame member 1018 as shown with reference to FIGS. 26A&B. In accordance with a preferred embodiment, and with reference to FIG. 26C, the tilt lock pin 1084 rides in a groove that has a detent 1122 in the end where a spring 1124 pulls the tilt lock pin 1084 into location and prevents tilt. When the upper vertical frame component 1086 is completely lowered, the tilt lock pin 1084 is pushed out of the detent 1122 allowing the vertical frame member 1016 to pivot relative to the horizontal frame member 1018 and fold forward.

Figures 26A, 26B, 26C:
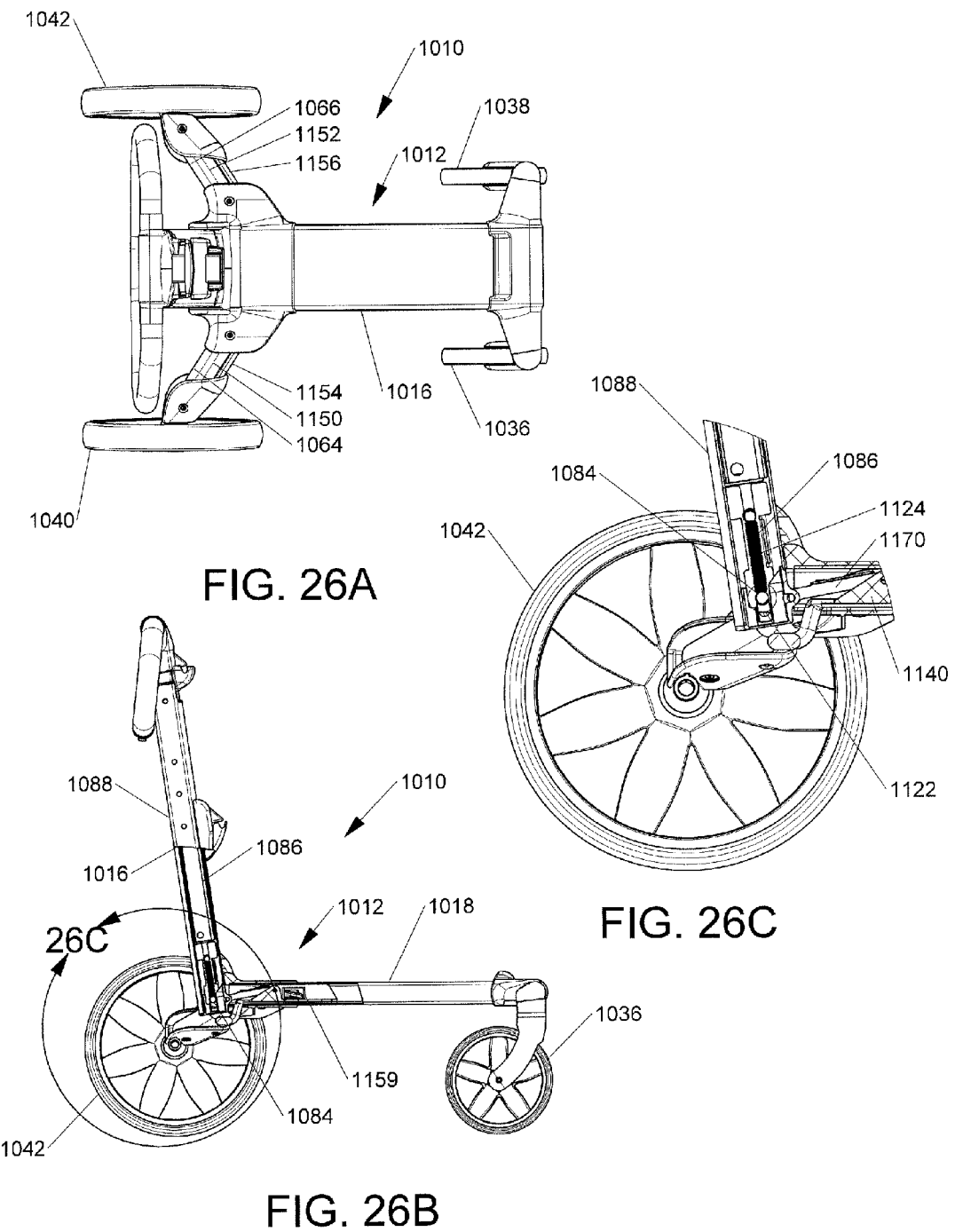
Figure 27A:
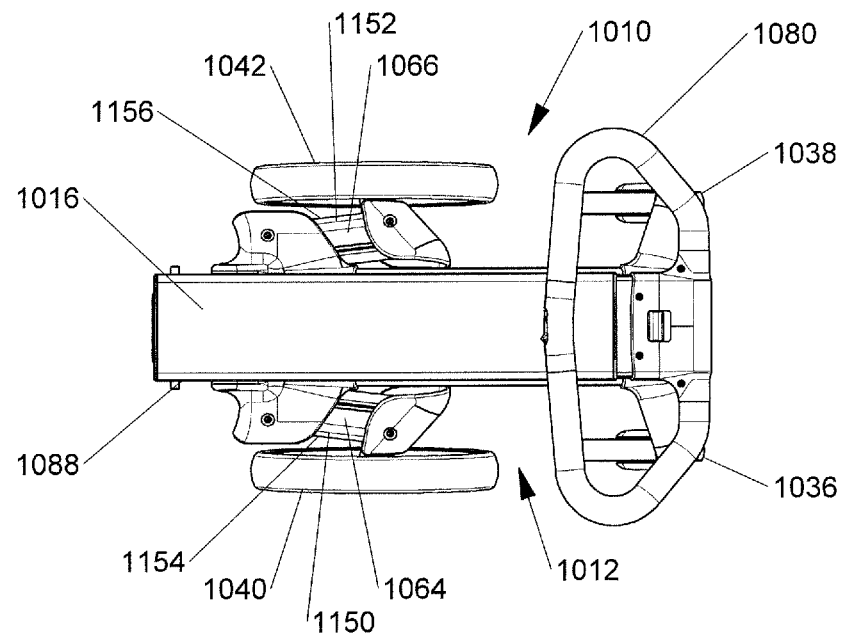
Figure 27B:
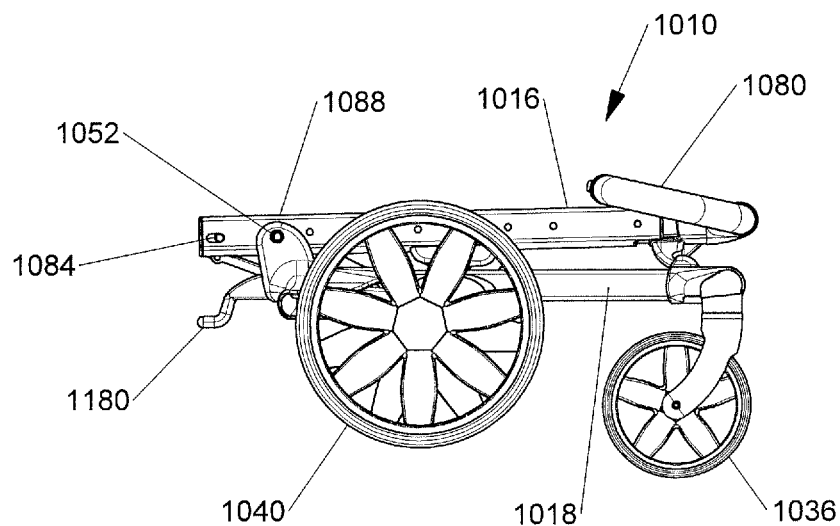
Figure 27C:
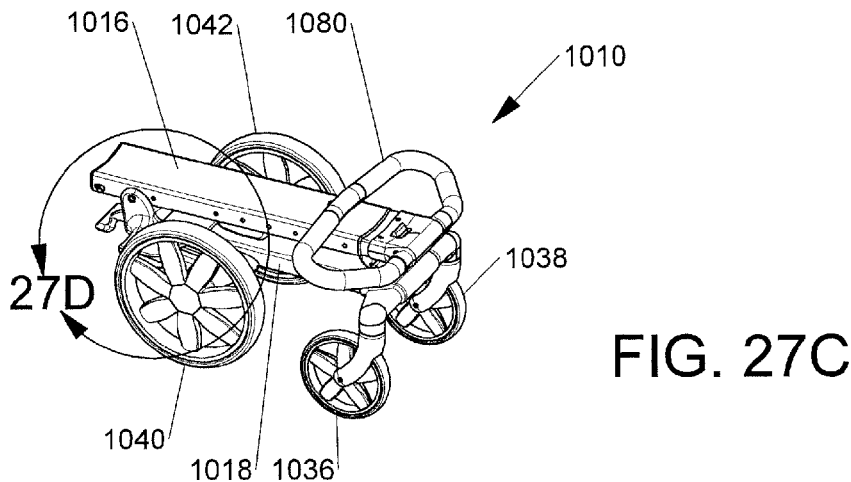
Figure 27D:
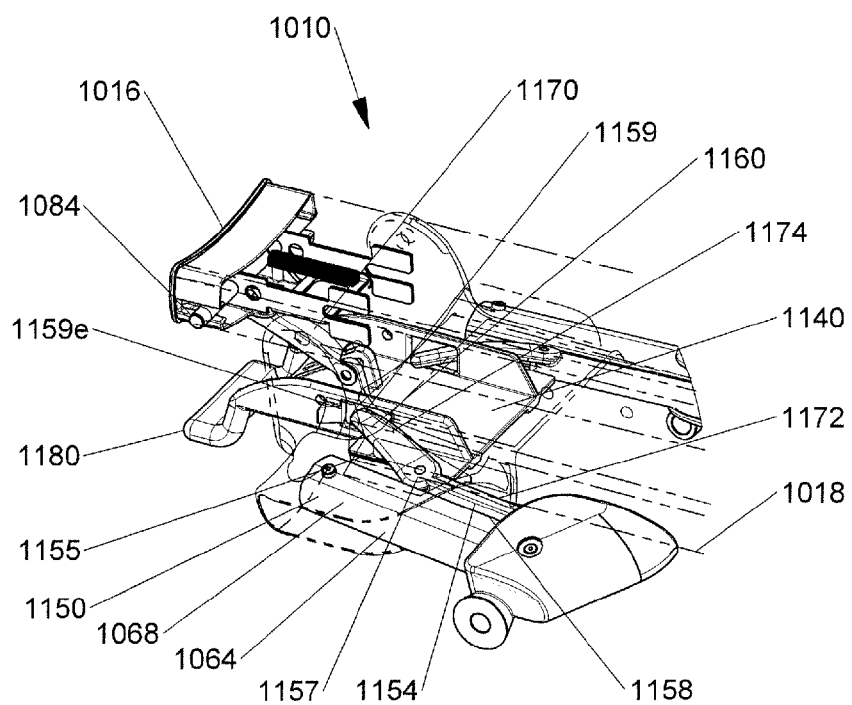

Referring to FIGS. 26A&B and 27A-D, as the vertical frame member 1016 is folded relative to the horizontal frame member 1018 the rear wheels 1040, 1042 are drawn toward the second end 1030 of the horizontal frame member 1018 and the body of the horizontal frame member 1018. This movement is achieved under the control of the slide plate 1140 and the first and second linkage assemblies 1150, 1152. The controlled movement of these elements as the vertical frame member 1016 is folded relative to the horizontal frame member 1018 causes the first and second rear wheels 1040, 1042 to move to their storage orientation, that is, at a position closer to the second end 1030 of the horizontal frame member 1018 and adjacent to the body of the horizontal frame member 1018. In addition, to folding the first and second rear wheels 1040, 1042 to a storage orientation, the first and second front wheels 1036, 1038 are provided with a pivot allowing the first and second front wheels 1036, 1038 to rotate about an axis perpendicular to the longitudinal axis of the horizontal frame member 1018 to further reduce the volumetric foot print of the support assembly 1012.

Once in the storage orientation, the support assembly 1012 is ready to be stowed away as desired.

It should be appreciated the present shopping cart is very well suited for urban dwellers who would be using the cart on mass transit, or in some cases, directly pushing the cart back to their dwelling.

The present shopping cart 10 eliminates several unnecessary steps in the shopping process, solves the problems and inconveniences mentioned above, reduces plastic and paper bag waste, and promotes environmental sustainability.

While the preferred embodiments have been shown and described, it will be understood that there is no intent to limit the invention by such disclosure, but rather, is intended to cover all modifications and alternate constructions falling within the spirit and scope of the invention.

The invention claimed is:
1. A collapsible cart, comprising:
a collapsible support assembly including a support frame having a vertical frame member and a horizontal frame member, the vertical frame member being pivotally secured to the horizontal frame member allowing the support frame to be selectively folded;
the vertical frame member is an elongated member having a first end and a second end;
the horizontal frame member is an elongated member having a first end and a second end, as well as an upper surface and a lower surface, the first end of the vertical frame member being pivotally connected to the first end of the horizontal frame member;
a plurality of wheels coupled to the horizontal frame member, the plurality of wheels are coupled to the horizontal frame member for movement between a use orientation and a storage orientation, wherein when the plurality of wheels are in the use orientation they extend from the horizontal frame member in a manner permitting engagement with a horizontal support surface such that the support assembly may roll thereupon;
the plurality of wheels including first and second rear wheels controlled by a linkage assembly, the linkage assembly including a slide plate which moves rear- wardly from the second end of the horizontal frame to cause movement of the first and second rear wheels from the use orientation to the storage orientation;

a first storage receptacle shaped and dimensioned for selective attachment to the support assembly; and a second storage receptacle shaped and dimensioned for selective attachment to the support assembly.

2. The cart according to claim 1, wherein the linkage assembly includes a first linkage assembly controlling movement of the first rear wheel and a second linkage assembly controlling movement of the second rear wheel.

3. The cart according to claim 2, wherein the first linkage assembly is composed of a first rear support arm and a first front parallelogram arm and the second linkage assembly is composed of a second rear support arm and a second front parallelogram arm.

4. The cart according to claim 3, wherein the slide plate includes a window which engages the first front parallelogram arm and the second front parallelogram arm to control movement.

5. The cart according to claim 4, wherein the second ends of the respective first rear support arm and the first front parallelogram arm are pivotally connected to the first rear wheel.

6. The cart according to claim 5, wherein the first end of the first rear support arm is pivotally connected to the first end of the horizontal frame member and the first end of the first front parallelogram arm is pivotally coupled to the horizontal frame member at a pivot point.

7. The cart according to claim 6, wherein an elongated tip member of the first front parallelogram extends beyond the pivot point and through the window formed in the slide plate.

\* \* \* \* \*